(12) United States Patent
Tamai et al.

(10) Patent No.: US 7,679,794 B2
(45) Date of Patent: Mar. 16, 2010

(54) IMAGE SCANNING APPARATUS

(75) Inventors: Kensuke Tamai, Shiojiri (JP); Yosuke Nakayama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 12/165,903

(22) Filed: Jul. 1, 2008

(65) Prior Publication Data

US 2009/0009827 A1  Jan. 8, 2009

(30) Foreign Application Priority Data

Jul. 2, 2007  (JP) ............................. 2007-174235

(51) Int. Cl.
- H04N 1/04 (2006.01)
- H04N 1/40 (2006.01)
- H04N 1/36 (2006.01)
- H04N 1/32 (2006.01)

(52) U.S. Cl. ...................... 358/497; 358/486; 358/474; 358/406; 358/412; 358/468; 358/443; 382/190

(58) Field of Classification Search ................. 358/486, 358/488, 497, 494, 406, 412, 468, 443; 382/190
See application file for complete search history.

(56) References Cited

U.S. PATENT DOCUMENTS

| 2008/0225357 A1* | 9/2008 | Ohara et al. ............... 358/498 |
| 2009/0009824 A1* | 1/2009 | Nakayama et al. ......... 358/474 |
| 2009/0010543 A1* | 1/2009 | Tamai et al. ............... 382/190 |

FOREIGN PATENT DOCUMENTS

| JP | 61160767 A | * | 7/1986 |
| JP | 06-113080 |   | 4/1994 |
| JP | 08-167974 |   | 6/1996 |
| JP | 08-274951 |   | 10/1996 |
| JP | 2000-113162 |   | 4/2000 |
| JP | 2000-113163 |   | 4/2000 |
| JP | 2007-017424 |   | 1/2007 |
| JP | 2007079076 A | * | 3/2007 |

* cited by examiner

*Primary Examiner*—Cheukfan Lee
(74) *Attorney, Agent, or Firm*—Workman Nydegger

(57) ABSTRACT

An image scanning apparatus includes a scanning section which scans an object opposite to a linear scanning area along a main scanning direction while moving the scanning area along a subscanning direction intersecting the main scanning direction. The scanning section generates image data on the basis of the result of the scanning. A control unit of the scanning section includes a first image acquiring section that acquires first image data by making the scanning section execute scanning at a first subscanning resolution. The control unit also has a pattern searching section that searches the first image data for the image of the predetermined pattern. A second image acquiring section of the control unit acquires second image data in such a manner that when the image of the predetermined pattern is not detected by the pattern searching section.

5 Claims, 14 Drawing Sheets

| SET COUNT | 0 | 1 | 2 | 3 | 4 | 5 | 6 | 7 | 8 | 9 | 10 |
|---|---|---|---|---|---|---|---|---|---|---|---|
| ADJUSTING VALUE Va | 0 | +1 | −1 | +2 | −2 | +3 | −3 | +4 | −4 | +5 | −5 |

VT

IMAGE SCANNING APPARATUS

BACKGROUND

1. Technical Field

The present invention relates to an image scanning apparatus and, more particularly, a technique for an image scanning apparatus to detect a predetermined pattern that specifies a base position defining a scanning position.

2. Related Art

Image scanning apparatuses, or scanners, which optically scan an object using an image sensor and which generate image data based on the scanned result are widely used. Scanners generally use a position sensor to determine a scanning position. Another known method for determining a scanning position detects a pattern image from scanned image data using a predetermined pattern formed of, for example, black and white areas on the scanner, and determines a scanning position using the position of the detected pattern image as the reference (for example, JP-A-2000-113162).

In the case of the technique described in JP-A-2000-113162, the carriage is located in the vicinity of a home position at power-on, and the position of the predetermined pattern is specified by the relationship with the home position. However, scanners have the possibility that the carriage is located at a position different from the home position at power-on, for example, immediately after abnormal termination. In that case, the position of the predetermined pattern is not specified, which needs a process of detecting the predetermined pattern. The detection of the predetermined pattern is preferably executed quickly without fail.

SUMMARY

An advantage of some aspects of the invention is that a technique for an image scanning apparatus to detect a predetermined pattern quickly and reliably is provided.

To offer the advantage, the invention can achieve the following embodiments or applications.

First Application

An image scanning apparatus according to a first aspect of the invention includes: a scanning section which scans an object opposite to a linear scanning area along a main scanning direction while moving the scanning area along a subscanning direction intersecting the main scanning direction and which generates image data on the basis of the result of the scanning; a control unit that controls the scanning section; and a pattern area including a predetermined pattern that defines a base position for specifying a position to be scanned by the scanning section, the predetermined pattern having a characteristic part that specifies a rough position of the predetermined pattern along the subscanning direction. The control unit includes: a first image acquiring section that acquires first image data by making the scanning section execute scanning at a first subscanning resolution; a pattern searching section that searches the first image data for the image of the predetermined pattern; a second image acquiring section that acquires second image data in such a manner that when the image of the predetermined pattern is not detected by the pattern searching section, the second image acquiring section makes the scanning section execute scanning at a preset second subscanning resolution lower than the first subscanning resolution so that image data generated by the scanning of the pattern area at the second subscanning resolution allows the image of the characteristic part to be detected therefrom; a characteristic-part searching section that searches the second image data for the image of the characteristic part; and a reprocessing instructing section which specifies the rough position of the pattern area along the subscanning direction on the basis of the position of the image of the characteristic part detected by the characteristic-part searching section and which makes the first image acquiring section execute scanning again at the rough position of the pattern area.

In this image scanning apparatus, the second image data is acquired by scanning at the second subscanning resolution lower than the first subscanning resolution. This makes the second image data correspond to a wider scanning area than that of the first image data. The second subscanning resolution is preset so that the image data generated by the scanning of the pattern area at the second subscanning resolution allows the image of at least the characteristic part to be detected therefrom. Therefore, if the second image data includes the image of the predetermined pattern, the characteristic part can be detected irrespective of the position of the preliminary scanning. The rough position of the predetermined pattern along the subscanning direction is specified by the characteristic part. Therefore, if the characteristic part is detected, the rough position of the image of the predetermined pattern can be specified. Accordingly, the image scanning apparatus can detect the predetermined pattern quickly and reliably.

Second Application

In this image scanning apparatus, preferably, the second image acquiring section acquires the second image data repeatedly by making the scanning section execute scanning repeatedly while changing the scanning position until the image of the characteristic part is detected by the characteristic-part searching section.

Since the image scanning apparatus acquires the second image data repeatedly until the image of the characteristic part is detected, the image scanning apparatus can reliably detect the predetermined pattern.

Third Application

In this image scanning apparatus, preferably, the predetermined pattern includes a plurality of areas arranged along the main scanning direction; and the characteristic part is the boundary of two adjacent areas of the areas that constitute the predetermined pattern.

This image scanning apparatus can detect the predetermined pattern including the plurality of areas arranged along the main scanning direction quickly and reliably.

Fourth Application

In this image scanning apparatus, preferably, the characteristic-part searching section searches for the image of the characteristic part across partial data corresponding to the position of the characteristic part in the second image data.

This image scanning apparatus can detect the image of the characteristic part from the second image data more efficiently, so that it can detect the predetermined pattern more quickly.

Fifth Application

In this image scanning apparatus, preferably, the second subscanning resolution is such that the distance between adjacent pixel rows along the subscanning direction of the image data is shorter than the distance corresponding to the length of the characteristic part along the subscanning direction.

This image scanning apparatus can set the second subscanning resolution so that the image data generated by the scanning of the pattern area at the second subscanning resolution allows the image of at least the characteristic part to be detected therefrom.

The invention can be achieved in various forms. For example, the invention can be achieved in the forms of an image processing method and apparatus, an image scanning method and apparatus, an image input method and apparatus, computer programs for achieving the functions of those methods and apparatuses, recording media that store the computer programs, data signals describing the computer programs carried in carrier waves.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described in the following order.

A. Embodiment

A-1. Structure of the Apparatus

A-2. Home-Position Searching Process

A. Embodiment

A-1. Structure of the Apparatus

Figure 1:
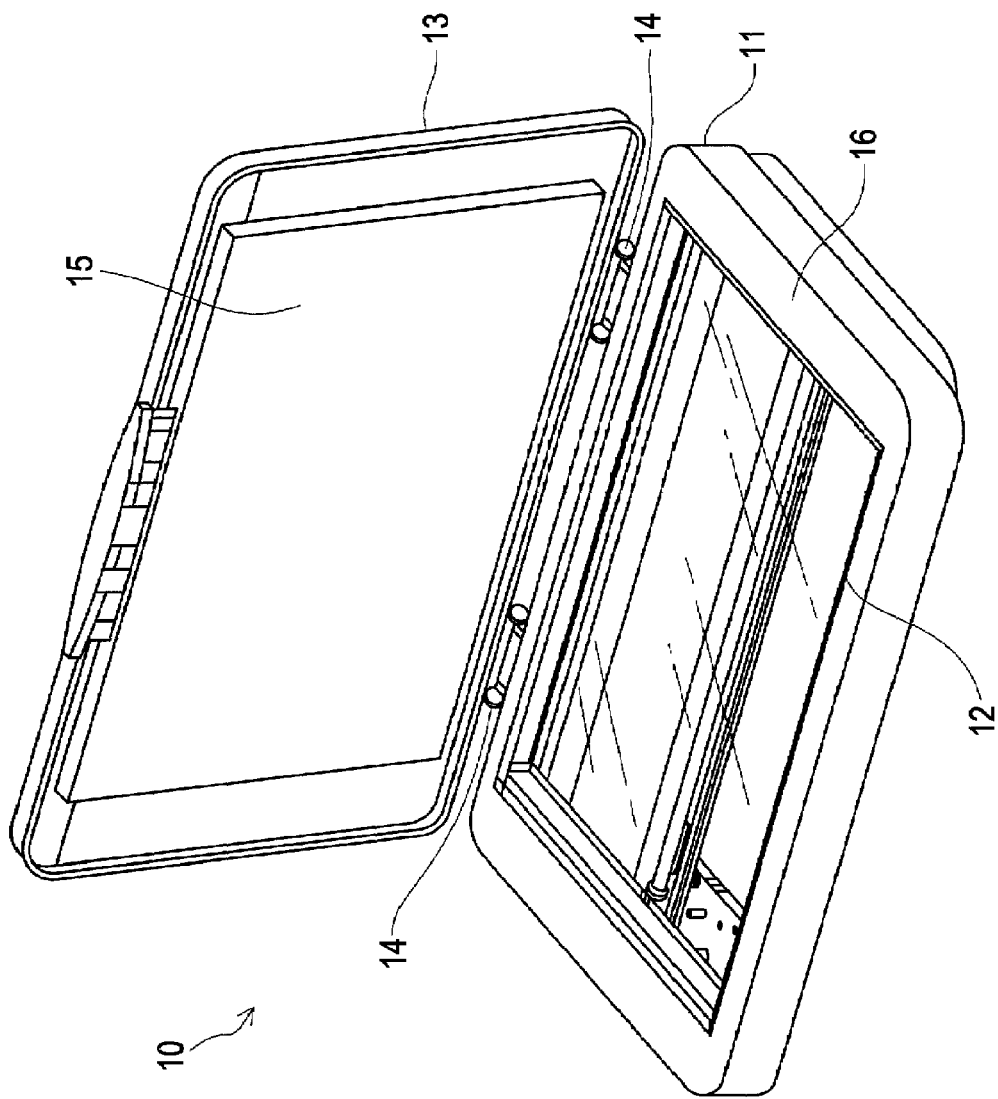
FIG. 1 is a schematic diagram illustrating the appearance of a scanner according to an embodiment of the invention.

FIG. 1 is a schematic diagram illustrating the appearance of a scanner 10 according to an embodiment of the invention. The scanner 10 is an image scanning apparatus that optically scans an object and generates image data on the basis of the scanning result. The scanner 10 functions also as an image processing apparatus in that it can process an image in the generated image data.

The scanner 10 of this embodiment is a flatbed scanner. The scanner 10 includes a case 11 in which an internal mechanism is to be housed; an original plate 12, and an original cover 13 which is mounted rotatably to the case 11 with hinges 14. The case 11 has on the top a supporting section 16 that supports the original plate 12.

The original plate 12 is a substantially rectangular flat plate which is mounted to the supporting section 16. The original plate 12 is formed of a transparent glass plate or plastic plate, for example. The surface of the original cover 13 opposite to the original plate 12 has a presser sheet 15 formed of resin, for example, colored substantially in white. The scanner 10 is configured such that an original placed on the original plate 12 is pressed from above by the original cover 13, so that the original can be brought into tight contact with the original plate 12.

Figure 2:
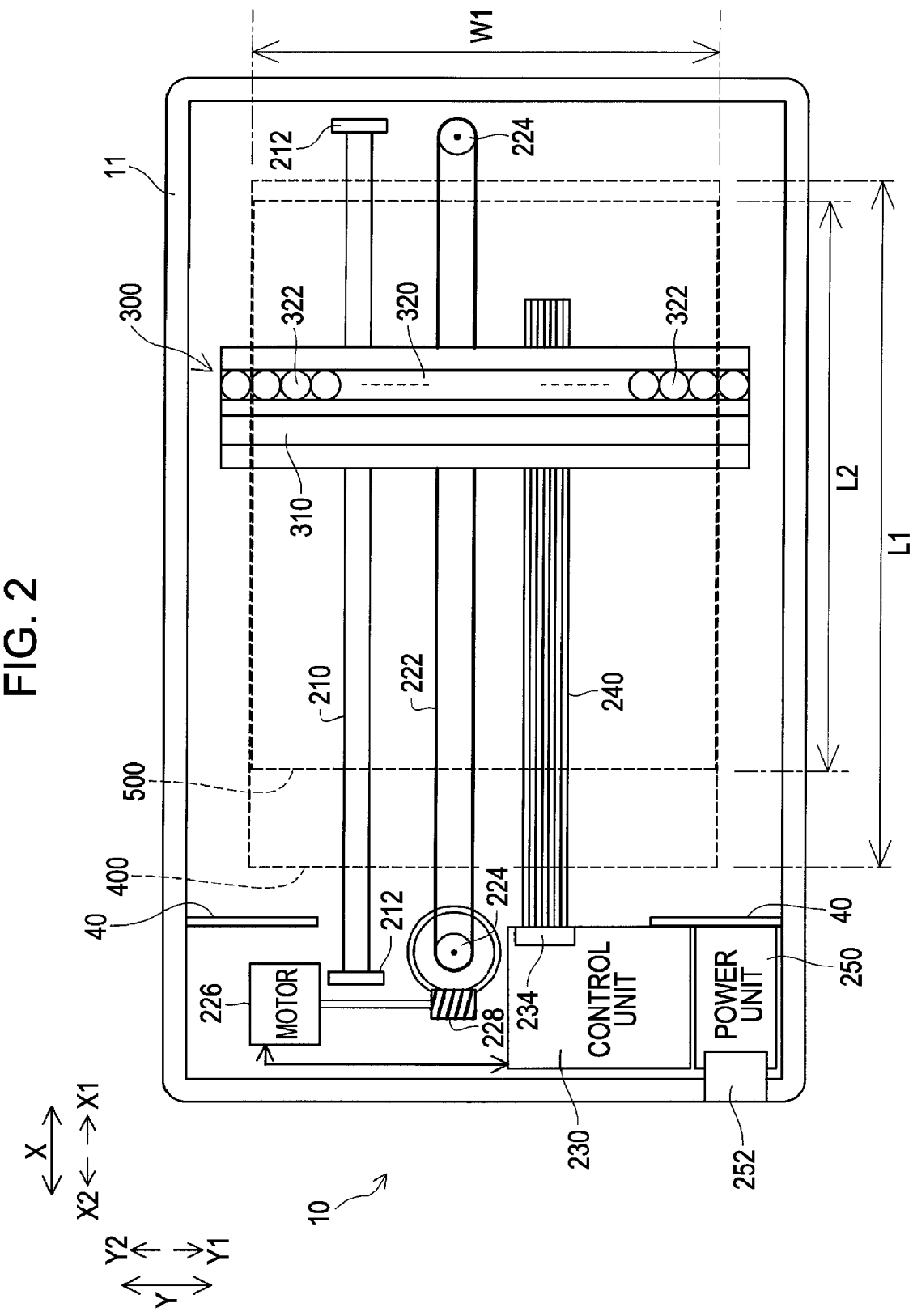
FIG. 2 is a schematic plan view of the internal mechanism of the scanner.

FIG. 2 is a schematic plan view of the internal mechanism of the scanner 10. FIG. 2 omits the illustrations of the original cover 13, the original plate 12, the supporting section 16 of the case 11 and so on shown in FIG. 1. The scanner 110 further includes in the case 11 a carriage 300, a guide rail 210, a timing belt 222, a stepping motor 226, stopper plates 40, a flat table 240, a control unit 230, and a power unit 250.

The guide rail 210 is disposed substantially in parallel to the length of the case 11 (in the direction X in FIG. 2), and fixed to the case 11 with brackets 212 at both ends. The carriage 300 is supported by the guide rail 210 in such a manner as to be moved back and forth along the guide rail 210.

In this specification, the direction in which the carriage 300 moves along the guide rail 210 (a direction X in FIG. 2) is referred to as a subscanning direction, of which one direction along the subscanning direction (a direction X1 in FIG. 2) is referred to as a subscanning forward direction, while the other direction along the subscanning direction is referred to as a subscanning backward direction (a direction X2 in FIG. 2). The direction perpendicular to the subscanning direction (a direction Y in FIG. 2) is referred to as a main scanning direction, of which one direction along the main canning direction (a direction Y1 in FIG. 2) is referred to as a main scanning forward direction, while the other direction along the main scanning direction is referred to as a main scanning backward direction (a direction Y2 in FIG. 2). The main scanning direction of this embodiment corresponds to a first direction of the invention, and the subscanning direction corresponds to a second direction of the invention.

The timing belt 222 is stretched between a pair of pulleys 224, and part of the timing belt 222 is connected to the carriage 300. One of the pair of pulleys 224 is rotated by the stepping motor 226 via a gear 228. As the pair of pulleys 224 is rotated, the timing belt 222 runs between the pulleys 224, so that the carriage 300 connected to the timing belt 222 moves along the guide rail 210 in the subscanning direction.

The carriage 300 has on the top a light-emitting section 310 and a light-receiving section 320. The light-emitting section 310 and the light-receiving section 320 are disposed across substantially the whole length of the carriage 300 along the main scanning direction. The light-emitting section 310 has a light-emitting device such as an LED, thereby emitting light. On the other hand, the light-receiving section 320 has a plurality of light-receiving devices 322 arranged along the main scanning direction. The light-receiving devices 322 are each configured by a combination of an image sensor such as a CCD or CMOS image pickup device and a rod lens (SELFCC lens) that collects light onto the image sensor. The light-receiving devices 322 receive reflected light of the light emitted from the light-emitting section 310 and output a voltage corresponding to the intensity of the received light. The light-receiving section 320 further includes an analog-to-digital converter circuit that converts the voltage output from the light-receiving devices 322 from analog to digital. The carriage 300 used in the scanner 10 of this embodiment is generally called a contact type.

The carriage 300 can optically scan an object opposite to the light-receiving section 320 across the width W1 along the main scanning direction by detecting the reflected light of the light emitted from the light-emitting section 310 using the light-receiving devices 322 of the light-receiving section 320. As the carriage 300 executes such scanning while moving in the subscanning direction, the image data of the scanned object opposite to the light-receiving section 320 is generated. The light-receiving devices 322 at both ends of the light-receiving section 320 outside the width W1 are reserve light-receiving devices 322. Of the components of the scanner 10, the carriage 300 and a mechanism for moving the carriage 300 back and forth (the guide rail 210, the timing belt 222, the stepping motor 226 and so on) correspond to a scanning section of the invention.

The power unit 250 supplies power for operating the scanner 10. The power unit 250 may have a structure of generating power by the unit itself or a structure of receiving external power through a connector 252.

The control unit 230 is connected electrically to the carriage 300 through a connector 234 and the flat cable 240 and is also connected electrically to the stepping motor 226, controlling the operation of the entire scanner 10. For example, the control unit 230 counts the number of steps of the stepping motor 226, and controls the power to be supplied from the power unit 250 to the stepping motor 226 according to the step count to thereby control the movement of the carriage 300 along the subscanning direction. Furthermore, the control unit 230 has a memory device (not shown), in which it can store image data generated by the scanning by the carriage 300. Moreover, the control unit 230 can be connected to the exterior of the scanner 10 through a connector (not shown), so that it can send the image data generated by the scanning by the carriage 300 to an external information processing unit (not shown).

Figure 3:
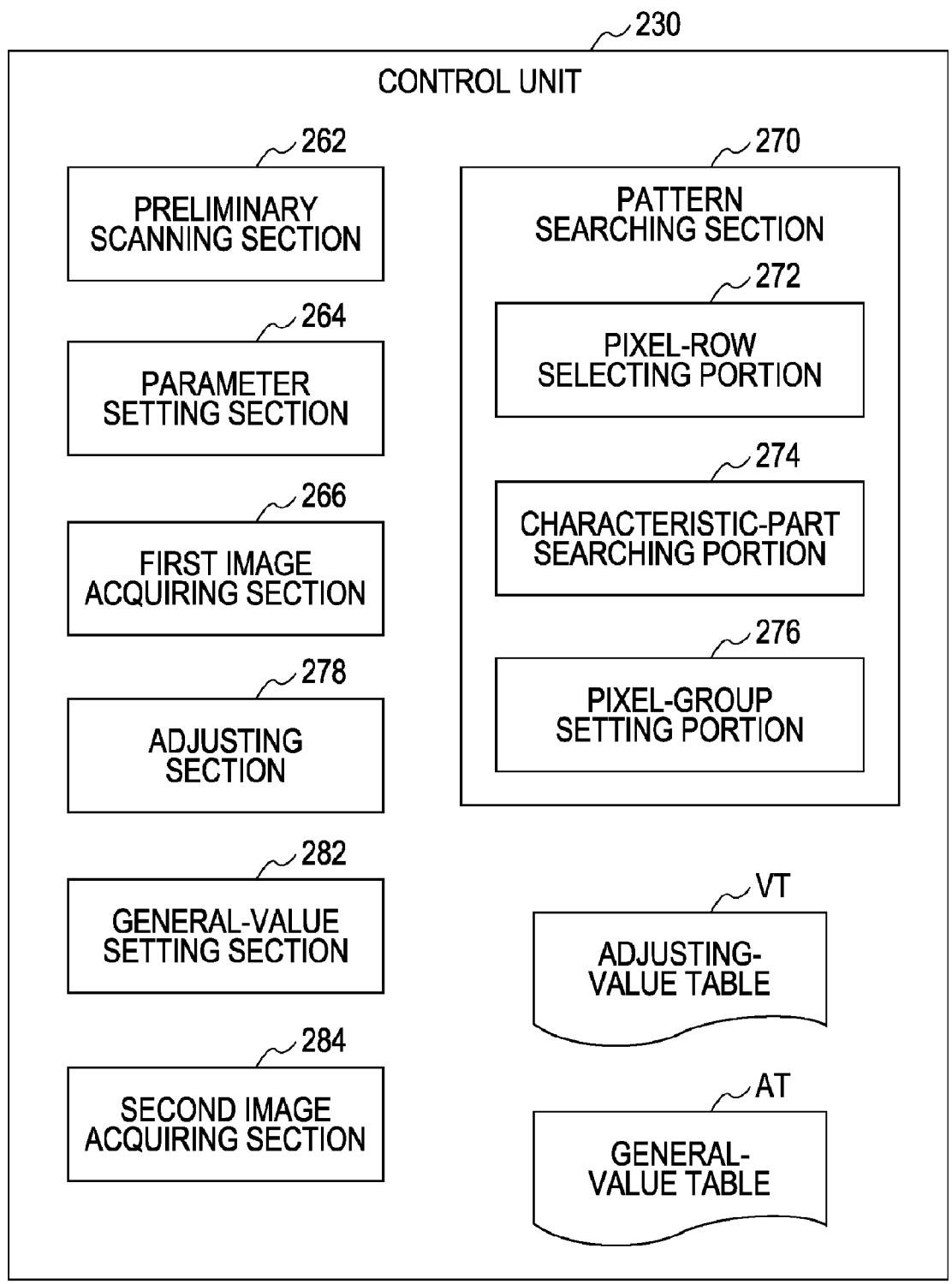
FIG. 3 is a block diagram of the functional structure for executing a home-position searching process by a control unit.

The control unit 230 further has a functional structure for executing a home-position searching process, to be described later. FIG. 3 is a block diagram showing the functional structure for executing the home-position searching process by the control unit 230. As shown in FIG. 3, the control unit 230 includes a preliminary scanning section 262, a parameter setting section 264, a first image acquiring section 266, a pattern searching section 270, an adjusting section 278, a general-value setting section 282, and a second image acquiring section 284. The pattern searching section 270 includes a pixel-row selecting portion 272, a characteristic-part searching portion 274, and a pixel-group setting portion 276. The control unit 230 has a CPU and a storage area (not shown). The control unit 230 achieves the functions of the above components in such a manner that the CPU reads and executes computer programs stored in the storage area. The functions of the components of the control unit 230 will be described in detail in the description of the home-position searching process described below.

The control unit 230 further includes a general-value table AT for use by the general-value setting section 282 and an adjusting-value table VT for use by the adjusting section 278. The general-value table AT and the adjusting-value table VT are stored in a storage area (not shown) of the control unit 230. The contents of the general-value table AT and the adjusting-value table VT will also be described in detail in the home-position searching process described below.

Figure 4:
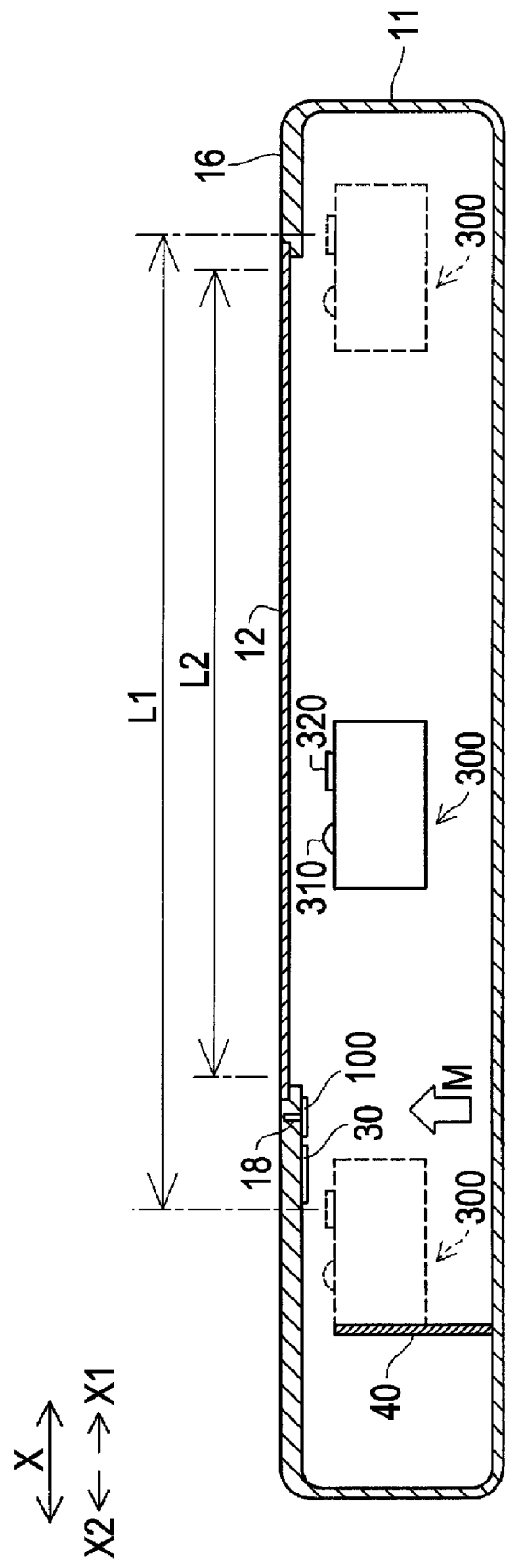
FIG. 4 is a schematic sectional view of the internal mechanism of the scanner.

FIG. 4 is a schematic sectional view of the internal mechanism of the scanner 10. Of the internal structure of the scanner 10 shown in FIG. 2, FIG. 4 omits the guide rail 210, the timing belt 222, the stepping motor 226, the control unit 230, the flat cable 240, the power unit 250 and so on. The carriage 300 can be moved to the position of the carriage 300 indicated by the broken line at the right of FIG. 4 in the subscanning forward direction (the direction X1 in FIG. 4) (hereinafter, referred to as a forward limit position), and to the position of the carriage 300 indicated by the broken line at the left of FIG. 4 in the subscanning backward direction (the direction X2 in FIG. 4) (hereinafter, referred to as a backward limit position). In other words, the carriage 300 can be moved back and forth along the subscanning direction within the limit in which the light-receiving section 320 of the carriage 300 is located within the length L1 shown in FIGS. 2 and 4. Therefore, as shown in FIG. 2, the carriage 300 can scan an object optically in a scannable area 400 defined by the width W1 along the main scanning direction and the length L1 along the subscanning direction. As shown in FIG. 4, the carriage 300 is in contact with the stopper plates 40 fixed to the case 11 along the main scanning direction at the backward limit position.

As shown in FIG. 4, the range in the subscanning direction in which the carriage 300 can scan an original, which is an object, placed on the original plate 12 is the range of a length L2. The length L2 is included in the length L1. As shown in FIG. 2, the carriage 300 can optically scan an object placed on the original plate 12, in an original scanning area 500 defined by the width W1 along the main scanning direction and the length L2 along the subscanning direction.

Figure 5:
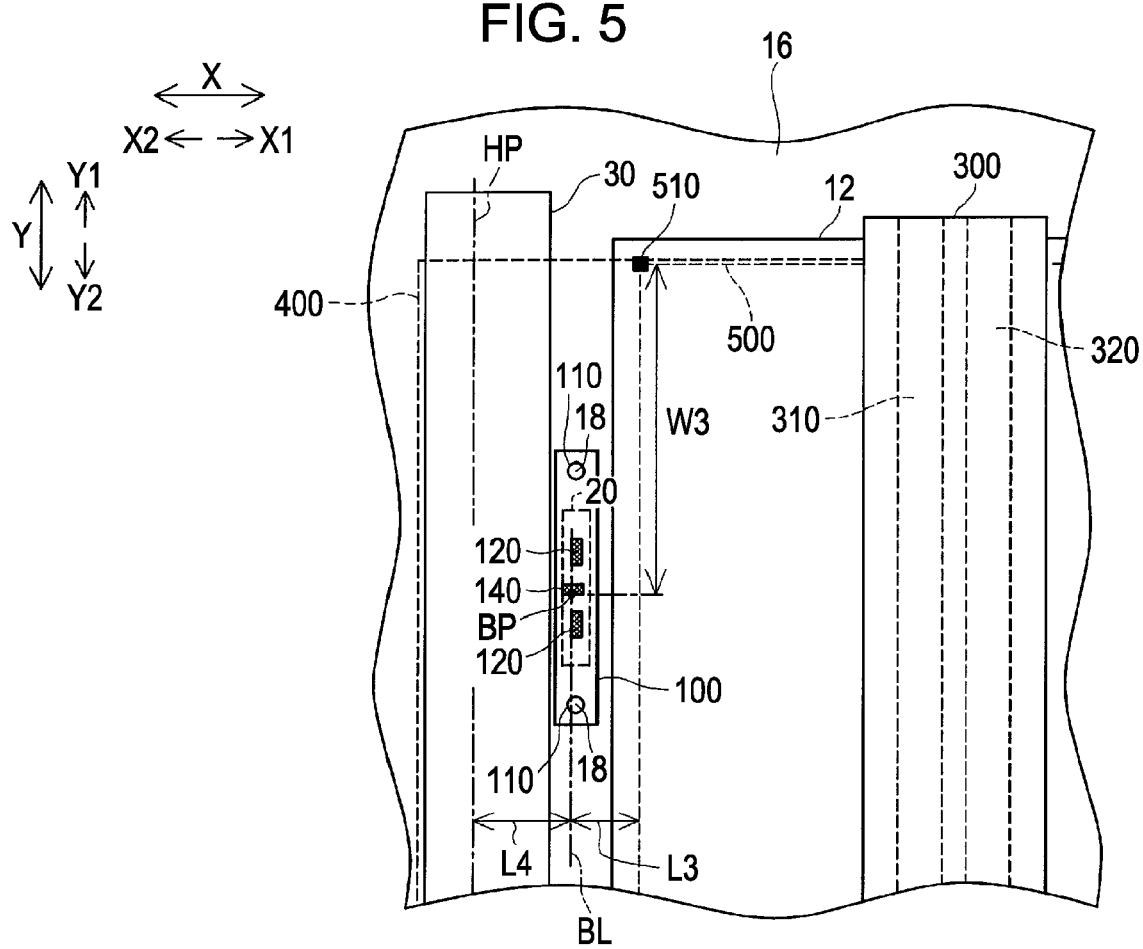
FIG. 5 is a fragmentary enlarged plan view of the scanner as viewed from the interior of the case.
Figure 6:
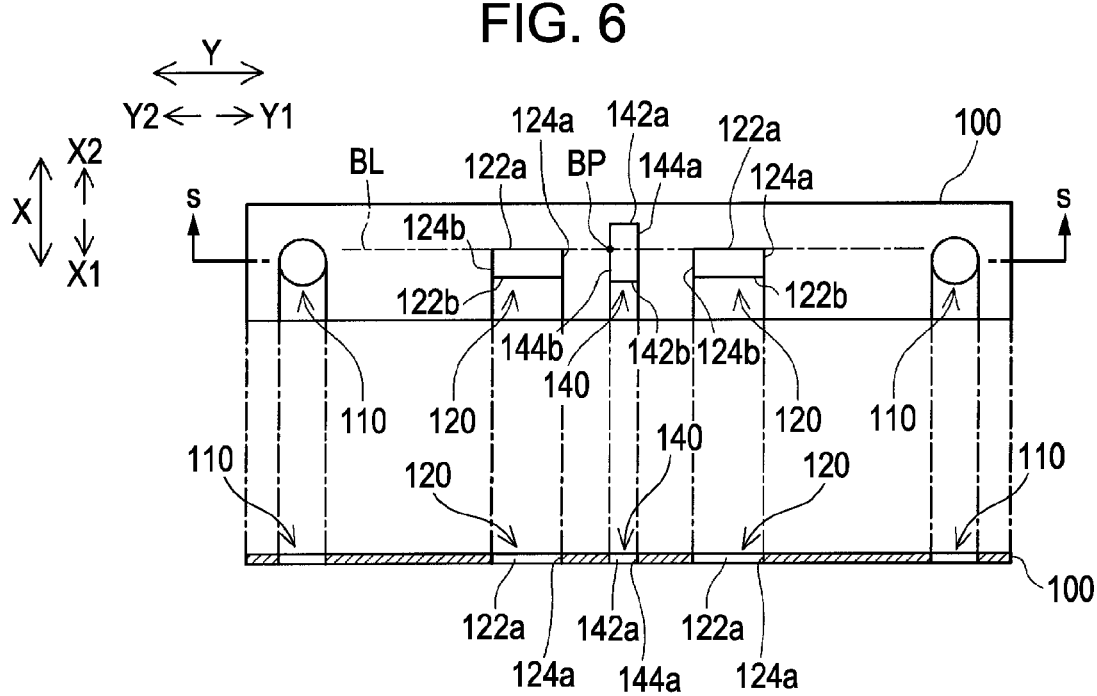
FIG. 6 is a detailed explanatory diagram showing a plan view and a section of a base-position specifying plate.

As shown in FIG. 4, the supporting section 16 has a base-position specifying plate 100 and a white base plate 30 on the inner surface. FIG. 5 is a fragmentary enlarged plan view of the scanner 10 as viewed from the interior of the case 11. FIG. 5 shows part of the plane of the scanner 10 as viewed from the direction indicated by the arrow M in FIG. 4. FIG. 6 is a detailed explanatory diagram showing a plan view and a section of the base-position specifying plate 100. FIG. 6 shows a plan view of the base-position specifying plate 100 as viewed from the direction indicated by the arrow M in FIG. 4 and a section taken along line s-s in the plan view.

The base-position specifying plate 100 is a substantially rectangular flat plate of a color with high reflectivity (for example, white), which is formed of polypropylene or polystyrene, for example. As shown in FIG. 5, the base-position specifying plate 100 is disposed in the position in the scannable area 400 remote from the original scanning area 500 in the subscanning backward direction (the direction X2).

As shown in FIG. 6, the base-position specifying plate 100 includes a pair of substantially circular positioning holes 110, a pair of rectangular first reference mark holes 120, and a rectangular second reference mark hole 140. All of the positioning holes 110, the first reference mark holes 120, and the second reference mark hole 140 are through holes that pass through the base-position specifying plate 100 in the direction perpendicular to the plane of the base-position specifying plate 100. The pair of positioning holes 110 is disposed in the vicinity of both ends of the base-position specifying plate 100 along the main scanning direction. The second reference mark hole 140 is disposed in the vicinity of the center of the plane of the base-position specifying plate 100. The pair of first reference mark holes 120 is disposed in the positions that hold the second reference mark hole 140 therebetween along the main scanning direction.

The positioning holes 110, the first reference mark holes 120, and the second reference mark hole 140 are made by pressing or machining using a metal mold so that their positional relationship is accurate. Thus, the positions of the first reference mark holes 120 and the second reference mark hole 140 relative to the positions of the positioning holes 110 in the base-position specifying plate 100 are accurate are accurate.

The base-position specifying plate 100 is mounted at the positions of the positioning holes 110 to a position on the inner surface of the supporting section 16 with head screws 18 (see FIG. 4). A method for mounting the base-position specifying plate 100 to the supporting section 16 is not limited to the method using the head screws 18. For example, the base-position specifying plate 100 may be mounted to the supporting section 16 by bonding, with projections on the supporting section 16 held in the positioning holes 110.

As shown in FIG. 6, the rectangular first reference mark holes 120 are disposed such that when the base-position specifying plate 100 is mounted to the supporting section 16, two first edges 122 (122a and 122b) become substantially parallel to the main scanning direction and two second edges 124 (124a and 124b) perpendicular to the first edges 122 become substantially parallel to the subscanning direction. The positions of the two first reference mark holes 120 along the subscanning direction are substantially the same. In other words, both of the first edges 122a of the two first reference mark holes 120 in the subscanning backward direction (the direction X2) are located on a line BL (hereinafter, referred to as a base line BL).

Likewise, as shown in FIG. 6, the rectangular second reference mark hole 140 is disposed such that when the base-position specifying plate 100 is mounted to the supporting section 16, two first edges 142 (142a and 142b) become substantially parallel to the main scanning direction, and two second edges 144 (144a and 144b) perpendicular to the first edges 142 become substantially parallel to the subscanning direction. The first edge 142a of the second reference mark hole 140 adjacent to the subscanning backward direction (the direction X2) is located at the position adjacent to the subscanning backward direction (the direction X2) with respect to the base line BL, while the first edge 142b adjacent to the subscanning forward direction (the direction X1) is located at the position adjacent to the subscanning forward direction (the direction X1) with respect to the base line BL. Therefore, the second edge 144b close to the main scanning backward direction (direction Y2) intersects the base line BL. The intersection between the second edge 144b and the base line BL is referred to as a base point BP.

As shown in FIG. 5, there is a colored area 20 at the position on the inner surface of the supporting section 16 to which the base-position specifying plate 100 is to be mounted. The colored area 20 in inner surface of the supporting section 16 is colored in a color with low reflectivity (for example, black). The colored area 20 includes an area opposite the first reference mark holes 120 and the second reference mark hole 140 when the base-position specifying plate 100 is mounted. Accordingly, when the base-position specifying plate 100 is mounted to the supporting section 16, the colored area 20 is exposed from the first reference mark holes 120 and the second reference mark hole 140.

Thus, the inner surface of the supporting section 16 is provided with a pattern of the base-position specifying plate 100 and the colored area 20 in which a high-reflective color (for example, white) area and a low-reflective color (for example, black) are arranged alternately along the main scanning direction (hereinafter, referred to as a base pattern). The base pattern has high contrast in color between adjacent areas arranged along the main scanning direction. The area of the base patter in the inner surface of the supporting section 16 corresponds to a pattern area of the invention. In place of the colored area 20, a black colored sheet may be used to form the base pattern.

The base line BL and the base point BP of the base pattern are used as a base position for specifying the position of the original scanning area 500. More specifically, as shown in FIG. 5, the point apart from the base line BL in the subscanning forward direction (the direction X1) by a distance L3, and apart from the base point BP in the main scanning forward direction (direction Y1) by a distance W3 is specified as a scanning-area reference point 510 of the original scanning area 500. The scanning-area reference point 510 is a vertex of the rectangular original scanning area 500 in the main scanning forward direction (direction Y1) and the subscanning backward direction (the direction X2). When the position of the scanning-area reference point 510 is specified, the position of the original scanning area 500 is specified on the basis of the sizes (W1 and L2, refer to FIG. 2) of the original scanning area 500 along the main scanning direction and the subscanning direction. In other words, the base pattern specifies a base position (the positions of the base line BL and the base point BP) for specifying the position of the original scanning area 500.

The scanner 10 of this embodiment also specifies the home position of the carriage 300 using the base pattern. The home position of the carriage 300 is the standby position of the carriage 300 while document scanning by the carriage 300 is not being executed. In this embodiment, the home position of the carriage 300 is set so that the light-receiving section 320 of the carriage 300 is opposite the white base plate 30. FIG. 5 shows the position of the light-receiving section 320 at the home position of the carriage 300 by an alternate long and short dashed line denoted by symbol HP. The position of the light-receiving section 320 at the home position of the carriage 300 is set to a position apart from the base line BL of the base pattern in the subscanning backward direction (the direction X2) by a distance L4.

The white base plate 30 is a substantially rectangular white flat plate, which is made of polypropylene or polystyrene, for example. As shown in FIGS. 4 and 5, the white base plate 30 is disposed in the position adjacent to the subscanning backward direction (the direction X2) with respect to the base-position specifying plate 100. The position of the white base plate 30 is set on the basis of the relationship with the position of the base pattern of the base-position specifying plate 100 and the home position of the carriage 300. The size of the white base plate 30 along the subscanning direction is set to a size within the scannable area 400, while the size along the main scanning direction is set to a value larger than the width W1 (see FIG. 2) along the main scanning direction of the scannable area 400. The white base plate 30 is fixed to the inner surface of the supporting section 16 by bonding, for example. The white color of the white base plate 30 corresponds to the base color of the invention, and the area of the white base plate 30 on the inner surface of the supporting section 16 corresponds to a base color area of the invention.

A-2. Home-Position Searching Process

Figure 7:
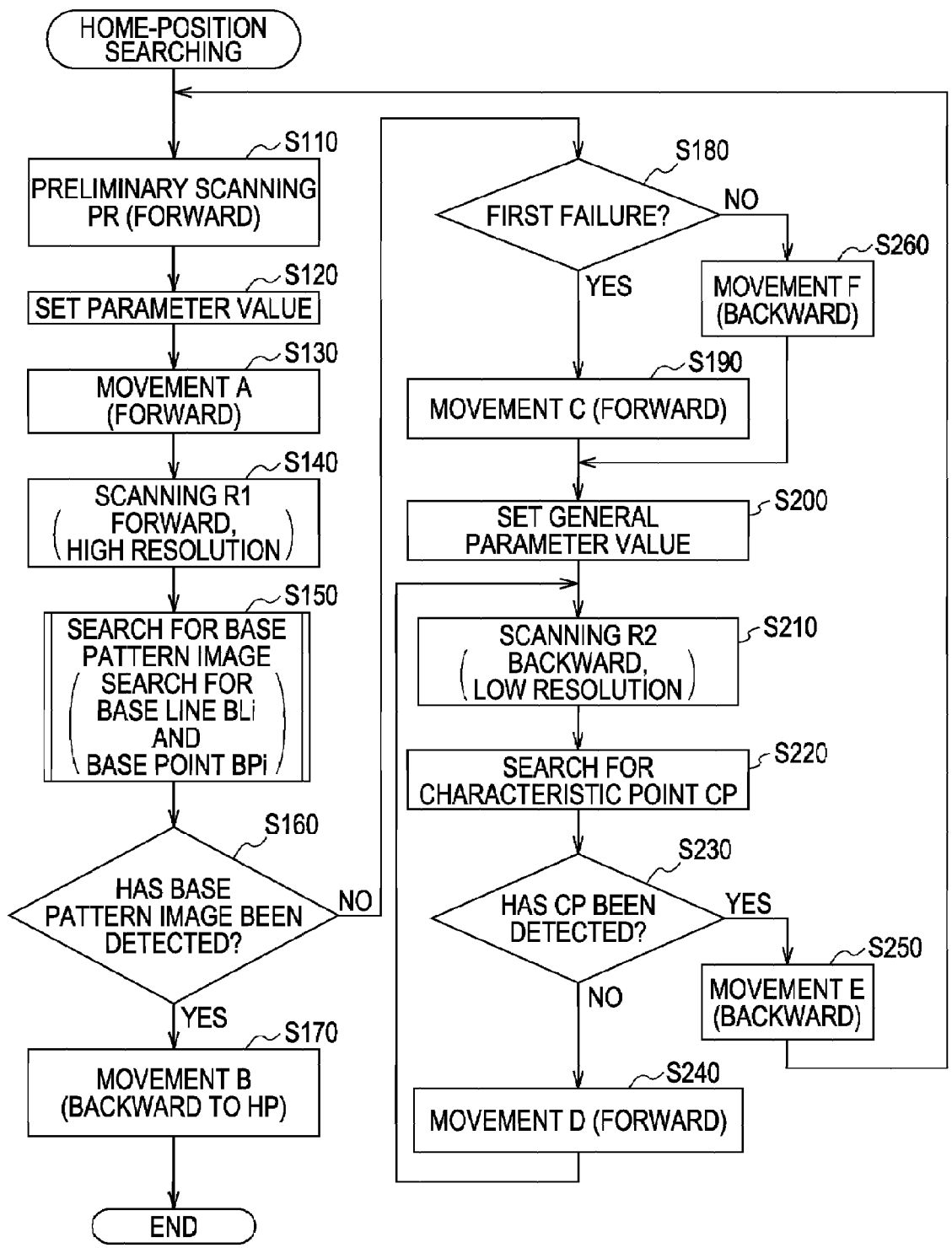
FIG. 7 is a flowchart for the home-position searching process by the scanner of the embodiment.
Figure 8:
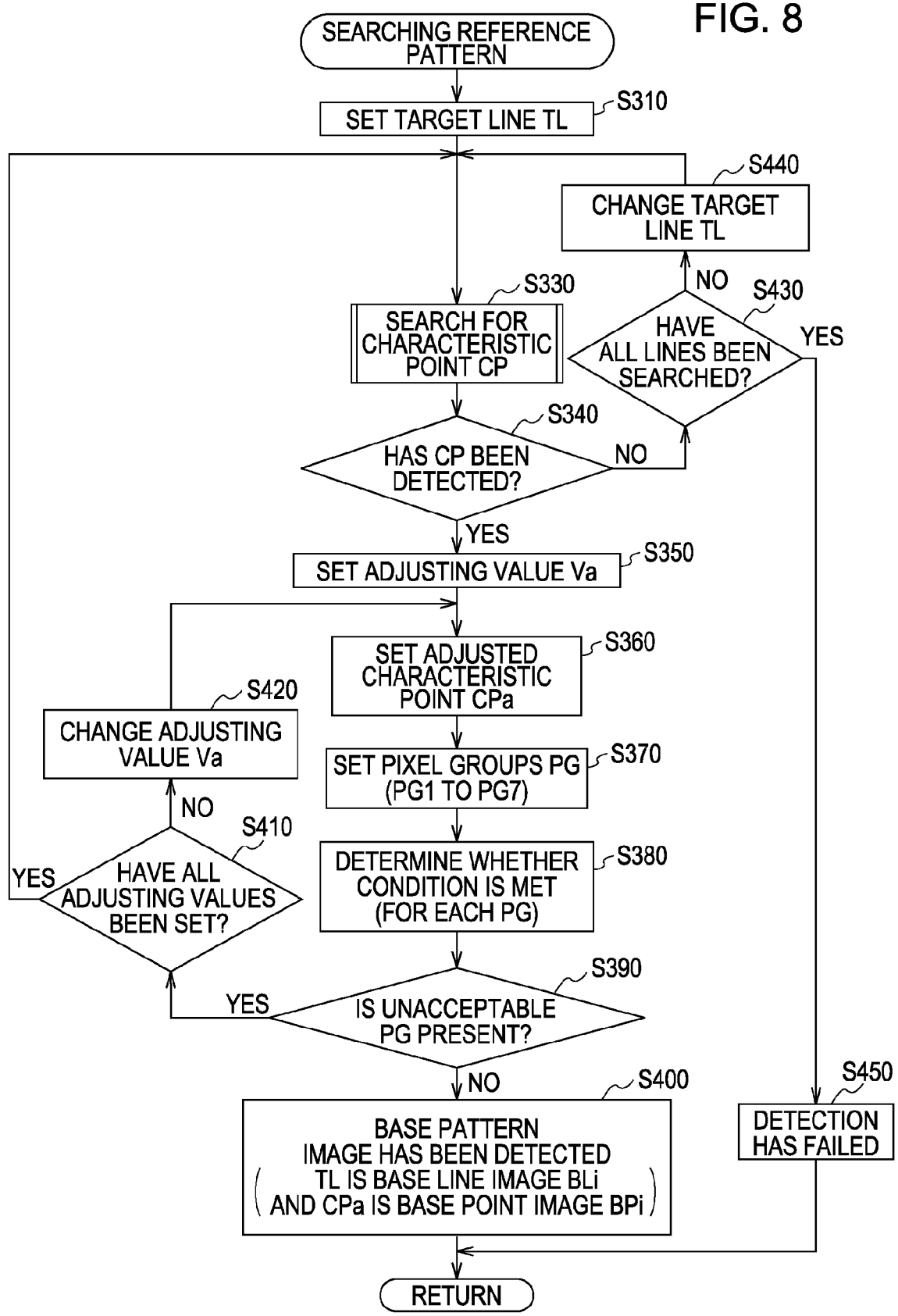
FIG. 8 is a flowchart for a base-pattern searching process in the home-position searching process.
Figure 9:
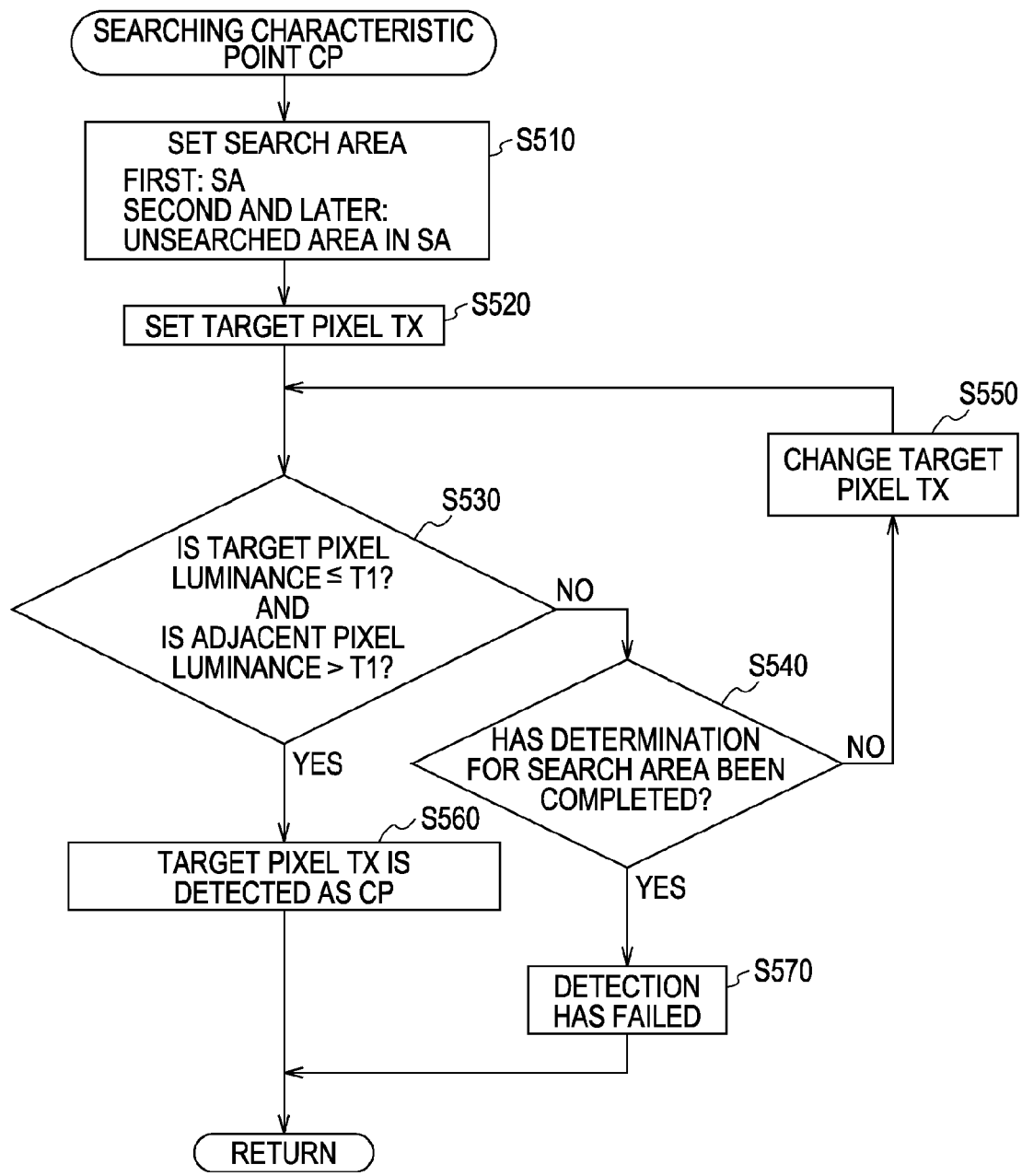
FIG. 9 is a flowchart for a characteristic-part searching process in the home-position searching process.

FIG. 7 is a flowchart for the home-position searching process by the scanner 10 of this embodiment. FIG. 8 is a flowchart for a base-pattern searching process in the home-position searching process. FIG. 9 is a flowchart for a characteristic-point searching process in the home-position searching process. FIGS. 10 to 13 illustrate examples of the movement of the carriage 300 in the home-position searching process.

The home-position searching process by the scanner 10 is a process of searching the home position of the carriage 300 from the base position (the positions of the base line BL and the base point BP) in the base pattern, and moving the carriage 300 to the home position. The home-position searching process is executed as, for example, part of an initializing process immediately after the scanner 10 is turned on. The scanner 10 of this embodiment is set so that if a power-off operation is executed normally, the power is turned off after the carriage 300 is moved to the vicinity of the home position. Therefore, the carriage 300 will have been located in the vicinity of the home position at the start of the home-position searching process immediately after power-on after the normal power-off operation.

In step S110 (FIG. 7), the preliminary scanning section 262 of the control unit 230 (FIG. 3) controls the carriage 300 and the stepping motor 226 (FIG. 2) to execute preliminary scanning PR. The preliminary scanning PR is a process of preliminarily scanning a predetermined scanning area to set scanning parameters for use in scanning by the scanner 10. The preliminary scanning PR is a process to be executed under the white base plate 30 (FIG. 5) so that the scanning parameters are set to normal values. The preliminary scanning PR is executed while the carriage 300 is being moved in the subscanning forward direction (the direction X1). The above-described scanning parameters are used in correcting signals which are output from the light-receiving devices 322 during scanning in consideration of influences such as non-uniformity in light amount, decrease in ambient light, and variations in the sensitivity of the light-receiving devices 322. The parameters include at least one of the lighting-up time of the light-emitting section 310, an analog front-end offset value, and shading data.

Figure 10:
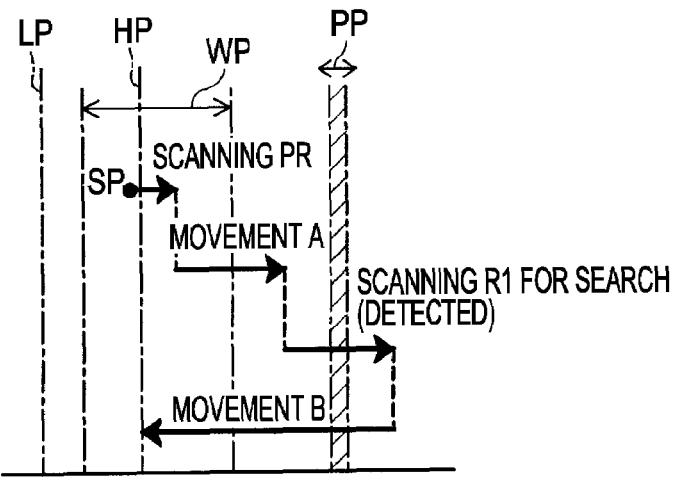
FIG. 10 is an explanatory diagram of an example of the movement of the carriage in the home-position searching process.

Of FIGS. 10 to 13 illustrating the motion of the carriage 300 during the home-position searching process, FIG. 10 shows the motion of the carriage 300 when the carriage 300 at the start of the home-position searching process (hereinafter, referred to as a starting-time carriage position SP) is in the vicinity of the home position which is a normal position. Referring to FIGS. 10 to 13, symbol LP indicates the position of the light-receiving section 320 when the carriage 300 is at the backward limit position (see FIG. 4); symbol HP indicates the position of the light-receiving section 320 when the carriage 300 is at the home position; symbol PP indicates the position of the base pattern along the subscanning direction; and symbol WP indicates the position of the white base plate 30 along the subscanning direction. As shown in FIG. 10, when the starting-time carriage position SP is in the vicinity of the home position, the white base plate 30 is scanned by the preliminary scanning PR.

Figure 11:
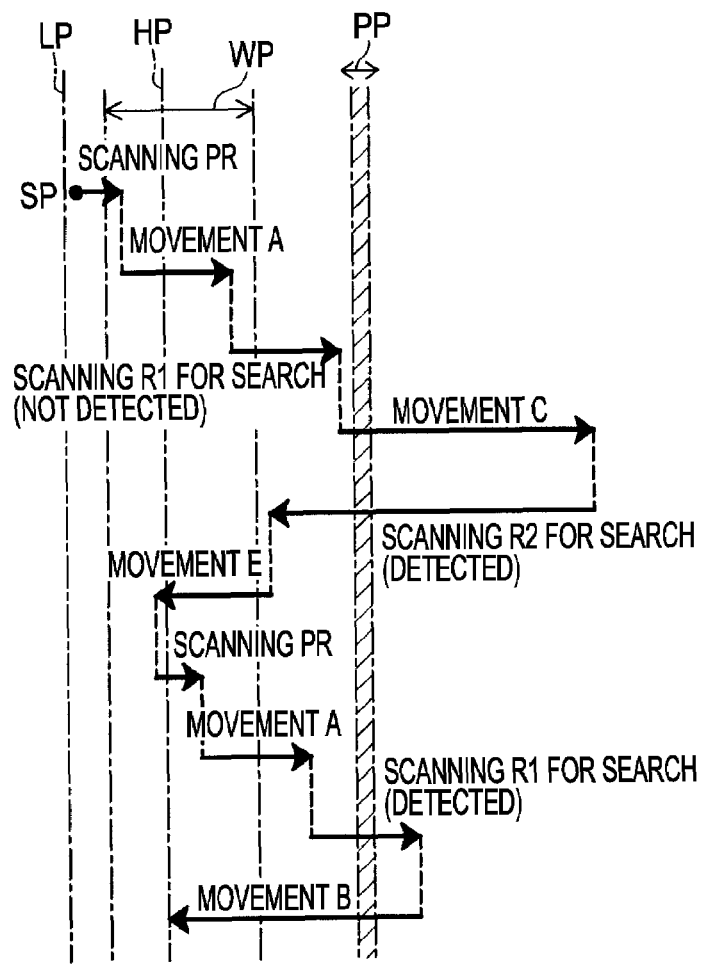
FIG. 11 is an explanatory diagram of an example of the movement of the carriage in the home-position searching process.
Figure 12:
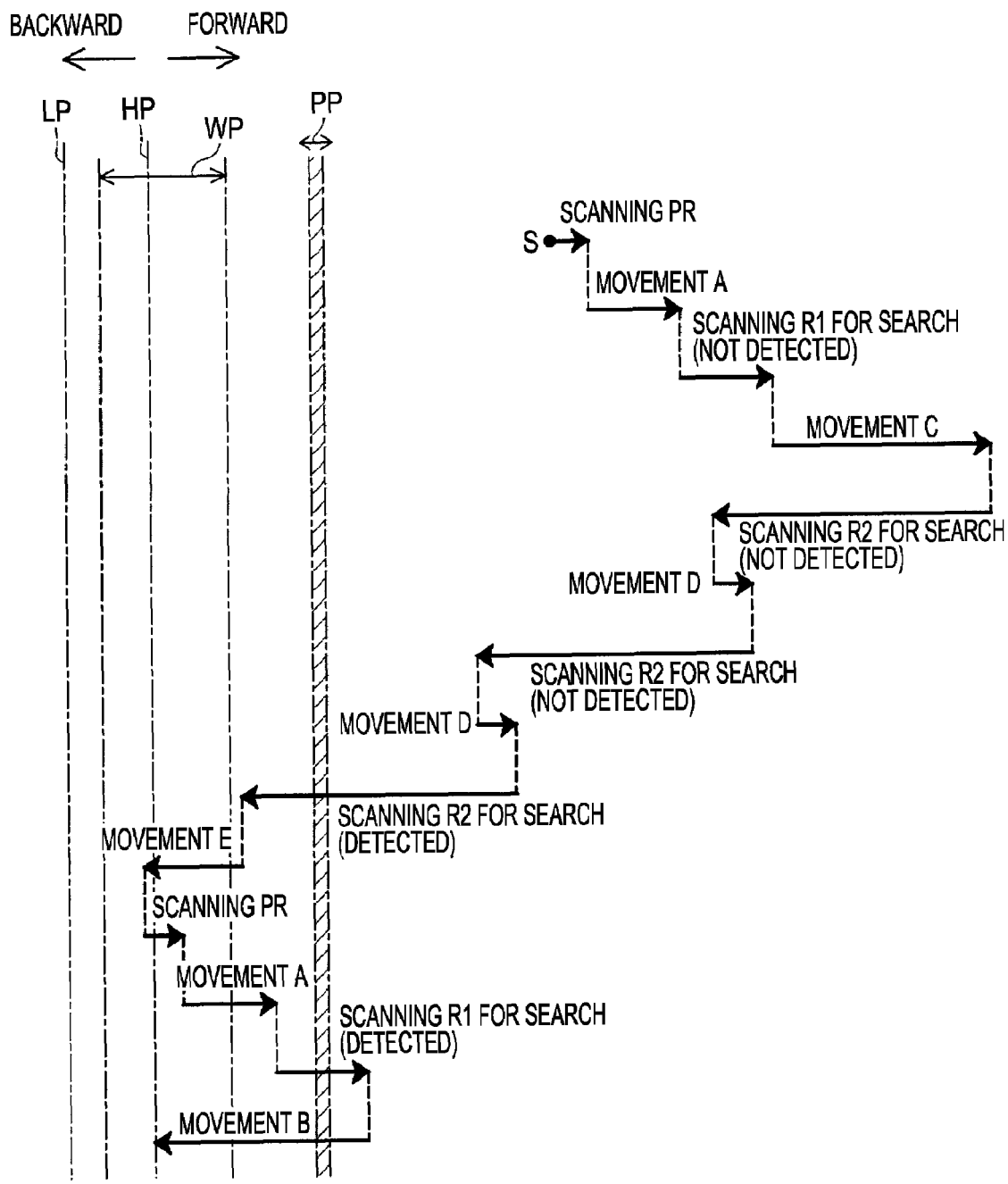
FIG. 12 is an explanatory diagram of an example of the movement of the carriage in the home-position searching process.
Figure 13:
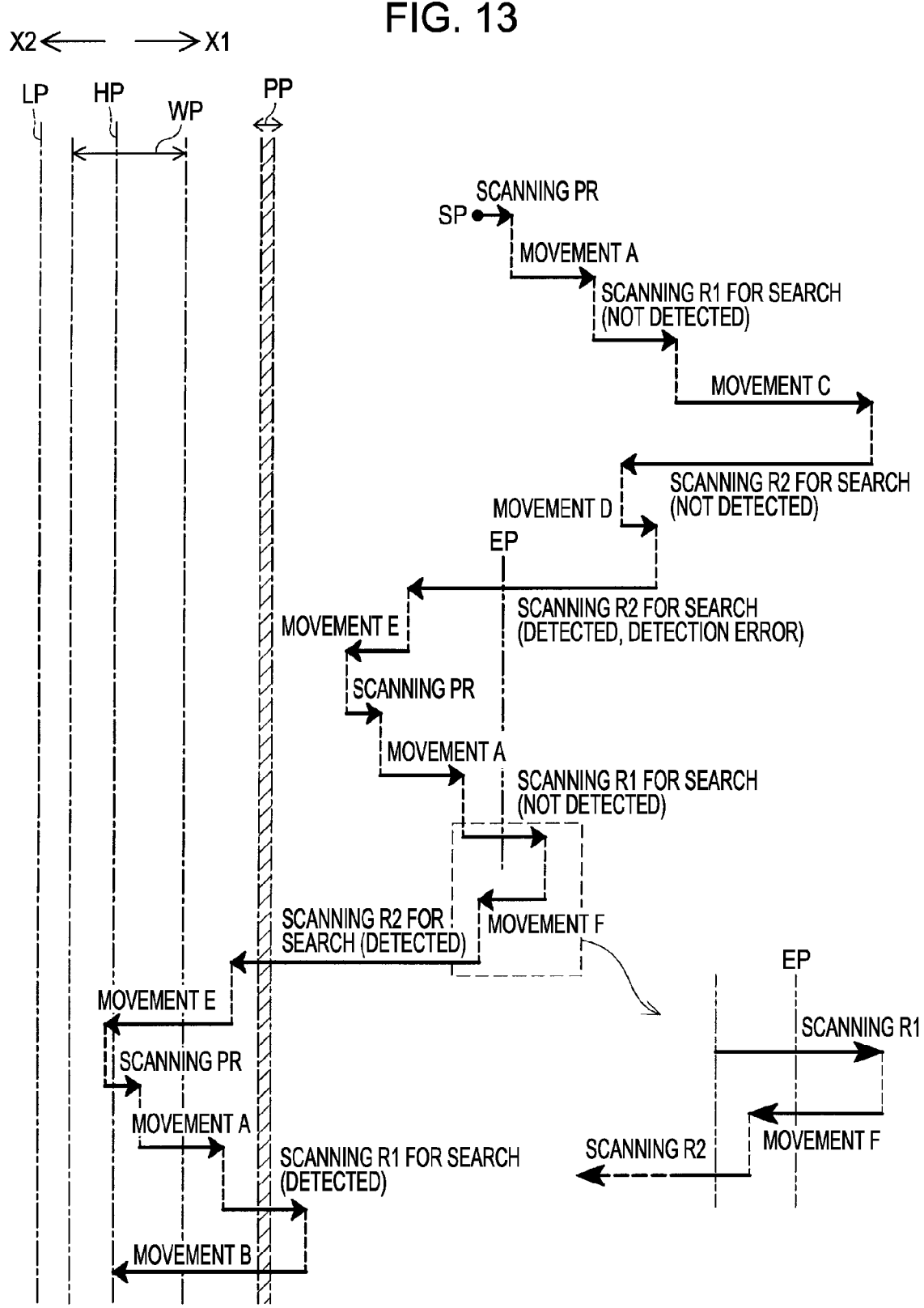
FIG. 13 is an explanatory diagram of an example of the movement of the carriage in the home-position searching process.

On the other hand, like after power-off by abnormal termination, the starting-time carriage position SP is sometimes out of the home position by a large amount in the subscanning backward direction (the direction X2) (see FIG. 11) or in the subscanning forward direction (the direction X1) (see FIGS. 12 and 13). When the starting-time carriage position SP is out of the home position by a large amount, an area other than the area of the white base plate 30 could be scanned by the preliminary scanning PR.

In step S120 (FIG. 7), the parameter setting section 264 of the control unit 230 (FIG. 3) sets scanning parameter values on the basis of the result of the preliminary scanning PR. The scanning parameter values are set on the basis of the result of the preliminary scanning PR and the color of the white base plate 30, which is white as the base color. More specifically, the parameter setting section 264 calculates, as the scanning parameter, a value such that the signals output from the light-receiving devices 322 in the preliminary scanning PR are corrected to signals indicative of white. This setting of the scanning parameter value could cause inappropriate scanning parameters to be set if the starting-time carriage position SP is out of the home position by a large amount (see FIGS. 11 to 13).

In step S130 (FIG. 7), the control unit 230 (FIG. 3) moves the carriage 300 in the subscanning forward direction (the direction X1) by a predetermined distance. The movement of the carriage 300 in step S130 is referred to as "movement A". The amount of movement A along the subscanning forward direction is set so that when the starting-time carriage position SP is in the vicinity of the home position (see FIG. 10), the carriage 300 moves from the position at the completion of the preliminary scanning PR to the position immediately before the base pattern.

In step S140 (FIG. 7), the first image acquiring section 266 of the control unit 230 (FIG. 3) makes the carriage 300 execute scanning while moving it in the subscanning forward direction (the direction X1) to generate scanned image data indicative of a scanned image I1. The scanning in step S140 is referred to as "scanning R1". The image data generated by the scanning R1 corresponds to first image data of the invention.

The amount of movement in the subscanning forward direction (the direction X1) by the scanning R1 is set so that when the starting-time carriage position SP is in the vicinity of the home position and when the white base plate 30 is scanned by the preliminary scanning PR, a base pattern is scanned by the scanning R1. Therefore, when the starting-time carriage position SP is in the vicinity of the home position (see FIG. 10), the scanned image I1 generated by the scanning R1 includes the image of the base pattern. On the other hand, when the starting-time carriage position SP is out of the home position by a large amount (see FIGS. 11 to 13), the scanned image I1 could include no base pattern image.

Figure 14:
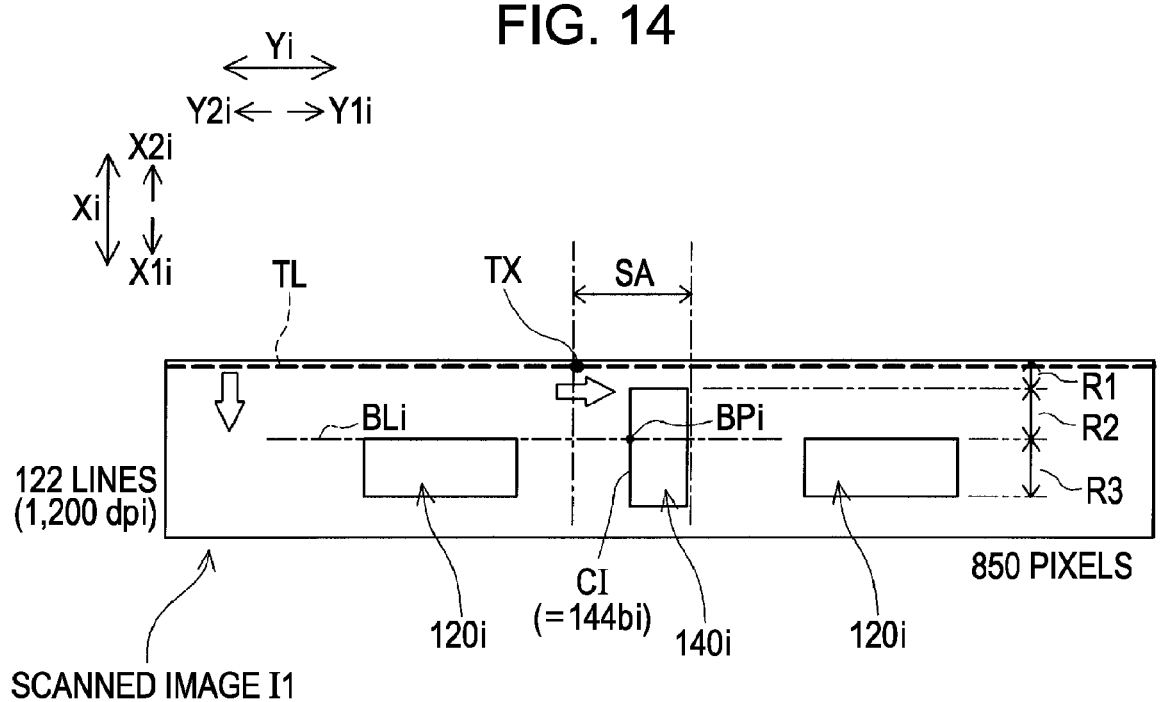
FIG. 14 is an explanatory diagram of an example of a scanned image generated by scanning.

FIG. 14 is an explanatory diagram of an example of the scanned image I1 generated by the scanning R1. The scanned image I1 shown in FIG. 14 includes a base pattern image. That is, the scanned image I1 includes the images 120$i$ of the first reference mark holes 120 (FIG. 6) and the image 140$i$ of the second reference mark hole 140.

As shown in FIG. 14, the scanned image I1 has, for example, a size of 850 pixels in the direction corresponding to the main scanning direction of the scanner 10 (the direction Yi in FIG. 14) by 122 pixels in the direction corresponding to the subscanning direction (the direction Xi). In this embodiment, the lines each formed of the 850 pixels arranged in the direction corresponding to the main scanning direction (the direction Yi) are referred to as pixel lines (or pixel rows). In other words, the scanned image I1 is an image formed of 122 pixel lines. In this embodiment, the resolution of the scanned image I1 along the direction corresponding to the main scanning direction (the direction Yi) is 1,200 dpi, while the resolution of the scanned image I1 along the direction corresponding to the subscanning direction (the direction Xi) is 1,200 dpi, which is higher than the resolution (300 dpi) of a scanned image I2 generated by scanning R2, described later, along the direction corresponding to the subscanning direction. The resolution of the scanned image I1 along the direction corresponding to the subscanning direction (the direction Xi) corresponds to a first subscanning resolution of the invention.

In the scanned image I1 and the scanned image I2 described below, the direction corresponding to the main scanning direction (the direction Yi in FIG. 14) of the scanner 10 is referred to as "a main scanning corresponding direction", the direction corresponding to the main scanning forward direction (the direction Y1$i$ in FIG. 14) is referred to as "a main scanning forward corresponding direction, and the direction corresponding to the main scanning backward direction (the direction Y2$i$ in FIG. 14) is referred to as "a main scanning backward corresponding direction". Hereinafter, the direction corresponding to the subscanning direction (the direction Xi in FIG. 14) of the scanner 10 is referred to as "a subscanning corresponding direction", the direction corresponding to the subscanning forward direction (the direction X1$i$ in FIG. 14) is referred to as "a subscanning forward corresponding direction, and the direction corresponding to the subscanning backward direction (the direction X2$i$ in FIG. 14) is referred to as "a subscanning backward corresponding direction".

In step S150 (FIG. 7), the pattern searching section 270 of the control unit 230 (FIG. 3) searches the scanned image I1 for the base pattern image. More specifically, the pattern searching section 270 searches the scanned image I1 for the image BLi of the base line BL (FIG. 6) and the image BPi of the base point BP in the base pattern.

Referring to FIG. 8 showing the flow of a base-pattern-image searching process, in step S310, the pixel-row selecting portion 272 (FIG. 3) of the pattern searching section 270 sets a target line TL. The pixel-row selecting portion 272 selects an outermost pixel line of the scanned image I1 (FIG. 14) in the subscanning backward corresponding direction as the target line TL.

In step S330 (FIG. 8), the characteristic-part searching portion 274 (FIG. 3) of the pattern searching section 270 searches for a characteristic point CP on the target line TL. The characteristic point CP configures a characteristic image CI indicative of a characteristic part of the base pattern. In this embodiment, the second edge 144$b$ along the main scanning backward direction (the direction Y2) of the second base mark hole 140 (FIG. 6) in the base pattern is used as the characteristic part. Therefore, as shown in FIG. 14, the characteristic image CI is the image 144$bi$ of the second edge 144$b$ of the second base mark hole 140 along the main scanning backward direction. The characteristic part of the base pattern is the boundary between a portion of high-reflective color (the base-position specifying plate 100) and a part of low-reflective color (the colored area 20 exposed from the second base mark hole 140). Therefore, the characteristic image CI is the image of the boundary between a high-luminance image and a low-luminance image.

Referring to FIG. 9 showing the flow of a characteristic-point-CP searching process, in step S510, the characteristic-part searching portion 274 (FIG. 3) sets a part on the target line TL as a search area for the characteristic point CP. In this embodiment, for the first search for the characteristic point CP on the target line TL, an initial search area SA shown in FIG. 14 is set as the search area. The initial search area SA is set in advance in consideration of the relationship between the base pattern and the carriage 300 so as to include a position at which the characteristic image CI is to be located when the scanned image I1 includes the base pattern image. As will be described later, for the second process or further of searching a target line TL for the characteristic point CP, an unsearched area in the initial search area SA is set as a search area.

In step S520 (FIG. 9), the characteristic-part searching portion 274 (FIG. 3) sets a target pixel TX in the search area on the target line TL set in step S510. Specifically, the characteristic-part searching portion 274 sets the outermost pixel in the search area on the target line TL in the main scanning backward corresponding direction (the direction Y2$i$ of FIG. 14) as the target pixel TX.

In step S530 (FIG. 9), the characteristic-part searching portion 274 determines whether the target pixel TX satisfies predetermined conditions. The predetermined conditions are that the luminance of the target pixel TX is equal to or lower than a first threshold value T1 and that the luminance of the pixel adjacent to the target pixel TX along the main scanning backward corresponding direction (the direction Y2$i$) is higher than the first threshold value T1. If it is determined that the predetermined conditions are satisfied (step S530: Yes), then the target pixel TX is detected as the characteristic point CP (step S560).

Figure 15:
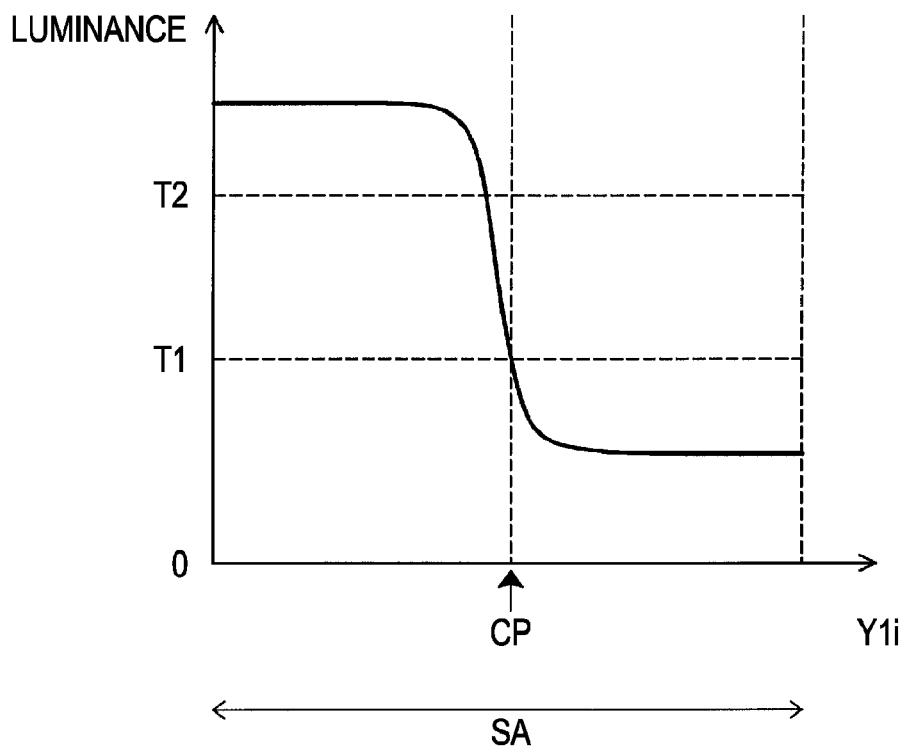
FIG. 15 is a diagram illustrating a method for detecting a characteristic point CP using predetermined conditions.

FIG. 15 is a diagram illustrating a method for detecting the characteristic point CP using the predetermined conditions. As shown in FIG. 15, the position in the initial search area SA on the target line TL at which the luminance changes sharply from a large value to a small value seems to be the characteristic point CP corresponding to the characteristic image CI. Accordingly, when the first threshold value T1 is set to a low value corresponding to low-reflective color (for example, 100 in the case where the maximum luminance is 255), a point that satisfies the predetermined conditions seems to be the characteristic point CP.

If it is determined that the predetermined conditions are not satisfied (step S530: No), then the characteristic-part searching portion 274 determines for all the pixels in the set search area whether the determination in step S530 has been completed (step S540). If there is a pixel for which the determination in step S530 has not been made (step S540: No), then the characteristic-part searching portion 274 sets the pixel adjacent in the main scanning forward corresponding direction (the direction Y1$i$) to the pixel that is set as the target pixel TX at the moment as a new target pixel TX (step S550), and makes the determination in step S530. Thus, the pixels on the target line TL are selected in sequence as the target pixel TX along the main scanning forward corresponding direction (the direction Y1$i$) for the determination of step S530.

In step S540, if it is determined that the determination in step S530 for all the pixels in the search area has been completed (step S540: Yes), then the characteristic-part searching portion 274 determines that the detection of the characteristic point CP on the target line TL has failed (step S570).

Referring back to FIG. 8, if the characteristic point CP has not been detected in step S330 (step S340: No), then the pattern searching section 270 of the control unit 230 (FIG. 3) determines whether all the pixel lines in the scanned image I1 have been selected as the target line TL to be searched for the characteristic point CP (step S430). If there is a pixel line that has not been selected as the target line TL (step S430: No), the pixel-row selecting portion 272 (FIG. 3) sets the pixel line adjacent in the subscanning forward corresponding direction (the direction X1$i$) to the pixel line that is set as the target line TL at the moment as a new target line TL (step S440). When the target line TL is changed, the characteristic-point-CP detection process in step S330 is executed for the new target line TL again. Thus, the pixel lines that constitute the scanned image I1 are selected in sequence as the target line TL along the subscanning forward corresponding direction (the direction X1i) for the characteristic-point-CP detection process.

In step S430, if it is determined that the characteristic-point-CP searching process in step S330 has been completed for all the pixel lines constituting the scanned image I1 (step S430: Yes), then the pattern searching section 270 (FIG. 3) determines that the detection of the base pattern image from the scanned image I1 has failed (step S450).

In the characteristic-point-CP searching process in step S330, if the scanned image I1 includes the base pattern image, it seems that the characteristic point CP is not detected from the target line TL in an area R1 of the scanned image I1 shown in FIG. 14. On the other hand, for areas R2 and R3 shown in FIG. 14, the characteristic point CP will be detected from the target line TL. If no base pattern image is included in the scanned image I1, it seems that the characteristic point CP is not detected. In any of those cases, the embodiment detects the characteristic point CP by the determination using the relatively simple conditions shown in step S530 in FIG. 9. Therefore, a point other than a point corresponding to the characteristic image CI could be erroneously detected as the characteristic point CP.

If the characteristic point CP has been detected in step S330 (FIG. 8) (step S340: Yes), then the adjusting section 278 of the control unit 230 (FIG. 3) sets an adjusting value Va (step S350). The adjusting value Va is a value for adjusting the position of the detected characteristic point CP along the main scanning corresponding direction (the direction Yi).

Figures 16, 17:
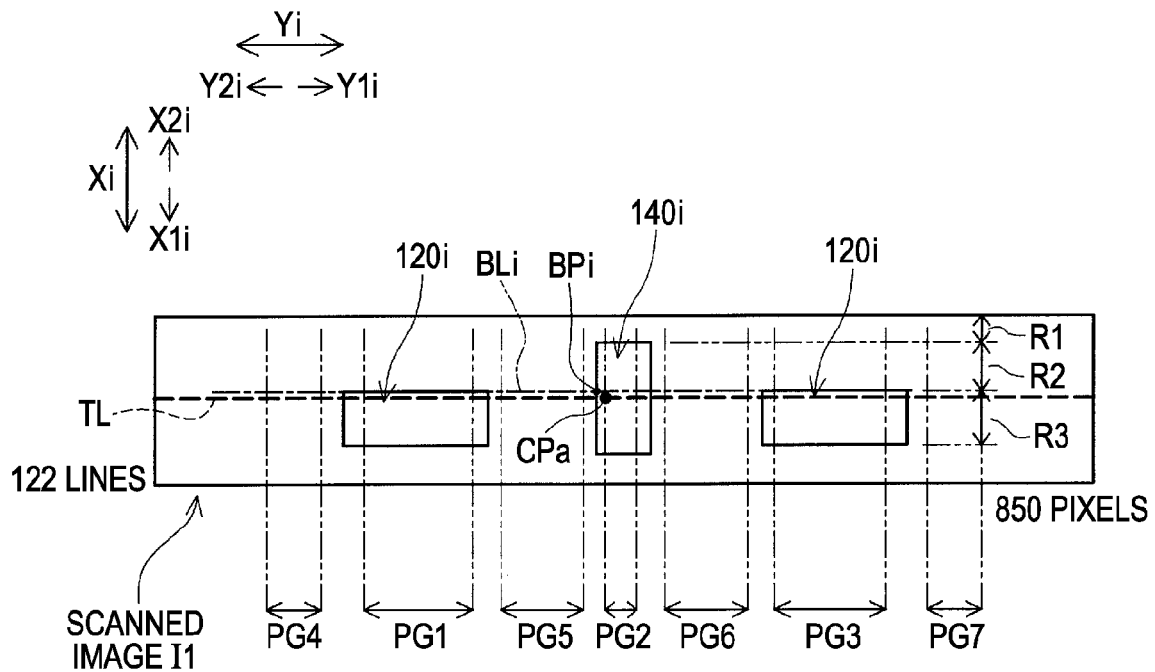
FIG. 16 is an explanatory diagram showing an example of the content of an adjusting-value table.
FIG. 17 is an explanatory diagram showing a method for setting pixel groups.

The adjusting value Va is set using the adjusting-value table VT (FIG. 3). FIG. 16 is an explanatory diagram showing an example of the content of the adjusting-value table VT. As shown in FIG. 16, the embodiment defines the adjusting value Va according to the preset count on a pixel-by-pixel basis. For example, when the preset count is zero, that is, when the adjusting value Va is set first, the adjusting value Va is set to 0 pixel, so that the adjustment of the characteristic point CP along the main scanning corresponding direction is not executed. When the preset count is one, the adjusting value Va is set to +1 pixel so that the characteristic point CP is moved by one pixel in the main scanning forward corresponding direction (the direction Y1i). When the preset count is two, the adjusting value Va is set to −1 pixel so that the characteristic point CP is moved by one pixel in the main scanning backward corresponding direction (the direction Y2i). The adjusting-value table VT defines adjusting values Va for preset counts to ten.

In step S360 (FIG. 8), the adjusting section 278 (FIG. 3) sets an adjusted characteristic point CPa. The adjusted characteristic point CPa is a point after the position of the characteristic point CP is adjusted along the main scanning corresponding direction on the basis of the adjusting value Va set in step S350.

In step S370 (FIG. 8), the pixel-group setting portion 276 (FIG. 3) sets a pixel group PG on the target line TL on the basis of the adjusted characteristic point CPa. FIG. 17 is an explanatory diagram showing a method for setting the pixel group PG. As shown in FIG. 17, in this embodiment, seven pixel groups PG (PG1 to PG7) corresponding to seven areas that constitute the base pattern (FIG. 6) are set. The seven areas that constitute the base pattern indicate three areas of low-reflective color (the part of the two first reference mark holes 120 and one second base mark hole 140) and four areas of high-reflective color (the part of the base-position specifying plate 100) adjacent to the three areas.

In this embodiment, the positions of the pixel groups PG along the main scanning corresponding direction (the direction Yi) are set in advance with reference to the position of the adjusted characteristic point CPa. For example, the end of the pixel group PG2 in the main scanning backward corresponding direction (the direction Y2i) is set to the adjusted characteristic point CPa, and the end of the pixel group PG2 in the main scanning forward corresponding direction (the direction Y1i) is set to a position apart from the adjusted characteristic point CPa by 23 pixels in the direction Y1i. Accordingly, it follows that the pixel group PG2 has 24 pixels. The positions of the other pixel groups PG are set in the same manner. The positions of the pixel groups PG along the main scanning corresponding direction (the direction Yi) are set in advance on the basis of the relationship between the base pattern and the carriage 300 so that when the scanned image I1 includes the base pattern image, the seven pixel groups PG (PG1 to PG7) correspond to the seven areas that constitute the base pattern. As shown in FIG. 17, there is an interval of predetermined pixels between adjacent pixel groups PG (for example, between PG1 and PG5).

In step S380 (FIG. 8), the pattern searching section 270 (FIG. 3) determines whether each set pixel group PG satisfies a condition. For the pixel groups PG (PG1, 2, and 3) corresponding to the areas of low-reflective color, the determination is performed using a condition whether, among all the pixels in each of the pixel groups PG, the proportion of pixels whose luminance is equal to or lower than the first threshold value T1 is a predetermined percentage (for example, 80%) or more. It seems that a pixel group PG that satisfies the condition presents the image of the area of low-reflective color in the base pattern. For the pixel groups PG (PG4, 5, 6, and 7) corresponding to the area of high-reflective color, the determination is performed using a condition whether, among all the pixels in each of the pixel groups PG, the proportion of pixels whose luminance is equal to or higher than the second threshold value T2 is a predetermined percentage (for example, 80%) or more. The second threshold value T2 is set to a value corresponding to high-reflective color (for example, 180 in the case where the maximum luminance is 255). It seems that a pixel group PG that satisfies the condition presents an image of the area of high-reflective color in the base pattern.

The reason the above condition is not a condition whether the luminance of all the pixels in the pixel groups PG is the first threshold value T1 or lower (or the second threshold value T2 or higher) is to prevent omission of detection of the base pattern due to excessively strict conditions in consideration of the influence of dust or noise. The reason an interval of pixels is provided between adjacent pixel groups PG, as described above, is the same.

The determination on the conditions is executed first for the pixel group PG1, and then it is executed in order of PG2, PG3, PG4, PG5, PG6, and PG7. If it is determined that the conditions are satisfied for all the seven pixel groups PG (step S390: No), then the pattern searching section 270 (FIG. 3) determines that the base pattern image has been successfully detected (step S400). In other word, the pattern searching section 270 determines that the target line TL which is set at present is the image BLi corresponding to the base line BL of the base pattern (FIG. 6) and that the adjusted characteristic point CPa is the image BPi corresponding to the base point BP.

On the other hand, if the condition of determination on one pixel group PG is not satisfied (step S390: Yes), then the determination in step S380 is completed irrespective of whether determination on the other pixel groups PG has been executed. In this case, the adjusting section 278 (FIG. 3) determines whether all the values defined in the adjusting-value table VT (FIG. 16) have been set as Va (step S410). If there is a value that is not set as the adjusting value Va (step S410: No), the adjusting section 278 changes the adjusting value Va (step S420). In other words, the adjusting section 278 sets a value in the box larger in preset count by one as a new adjusting value Va.

After that, the setting of the adjusted characteristic point CPa (step S360), the setting of the pixel group PG (step S370), and the setting of the condition for each pixel group PG (step S380) are executed using the changed adjusting value Va. Thus, base-pattern image searching using the seven pixel groups PG is executed while the positions of the pixel groups PG are being finely adjusted in the main scanning corresponding direction. If all the values defined in the adjusting-value table VT have been set in advance as the adjusting value Va (step S410: Yes), then the process returns to the searching for the characteristic point CP in step S330.

As described above, in the process of searching the scanned image I1 for the base pattern image (FIG. 8), the target line TL is set in sequence along the subscanning forward corresponding direction (the direction X1$i$), and in the search area on the target line TL, the searching for the characteristic point CP is executed. If the characteristic point CP is detected, the setting of the pixel groups PG and the determination on the condition for each pixel group PG are executed on the target line TL. Therefore, when the target line TL is set in the area R1, as shown in FIG. 17, the characteristic point CP seems not to be detected from the target line TL, so that the setting of the pixel groups PG and the determination of the conditions are not executed. On the other hand, when the target line TL is set within the area R2, the characteristic point CP is detected from the target line TL but it is determined in the determination for each pixel group PG that the conditions are not satisfied. When the target line TL is set in an area R3 for the first time, it seems that the characteristic point CP is detected from the target line TL and the conditions for all the pixel groups PG are satisfied. The target line TL at that time is determined to be the image BLi corresponding to the base line BL, and the adjusted characteristic point CPa is determined to be the image BPi corresponding to the base point BP.

In the searching of the characteristic point CP (step S330 in FIG. 8), if a point other than the point corresponding to the characteristic image CI has been detected erroneously as the characteristic point CP, the detection of the base pattern image will fail in the following determination (step S380).

In step S150 of the home-position searching process (FIG. 7), if the base pattern image has been detected from the scanned image I1 (step S160: Yes), the control unit 230 (FIG. 3) moves the carriage 300 to the home position (step S170) and then terminates the home-position searching process. The movement of the carriage 300 in step S170 is referred to as "movement B".

As shown in FIG. 5, the position of the light-receiving section 320 (the position of the HP in FIG. 5) with the carriage 300 in the home position is determined to be apart from the base line BL of the base pattern in the subscanning backward direction (the direction X2) by L4. The control unit 230 grasps the position of the image BLi corresponding to the base line BL in the base pattern image detected in the scanned image I1. The control unit 230 calculates the amount of the movement B from the position of the image BLi in the scanned image I1, and moves the carriage 300 to the home position accurately (see FIG. 10).

In contrast, in step S150 (FIG. 7), if the detection of the base pattern image from the scanned image I1 fails (step S160: No), and if it is the first failure (step S180: Yes), the control unit 230 (FIG. 3) moves the carriage 300 in the subscanning forward direction (the direction X1) by a predetermined distance (step S190). The movement of the carriage 300 in step S190 is hereinafter referred to as "movement C".

If the starting-time carriage position SP is out of the home position by a large amount (see FIGS. 11 to 13), the scanned image I1 could be an image including no base pattern image. In that case, the detection of the base pattern image from the scanned image I1 in step S150 fails, so that the movement C is executed as shown in FIGS. 11 to 13. Subsequently, searching for the position of the base pattern is executed as follows:

In step S200 (FIG. 7), the general-value setting section 282 of the control unit 230 (FIG. 3) sets the predetermined scanning parameters for use in scanning (described above) to general parameters. The general parameters are set in advance so that image data generated by the base pattern scanning using the general parameters allows detection of at least the characteristic point CP, and are defined in the general-value table AT (FIG. 3).

In step S210 (FIG. 7), the second image acquiring section 284 of the control unit 230 (FIG. 3) makes the carriage 300 execute scanning using the set general parameters while moving it in the subscanning backward direction (the direction X2) to generate scanned image data describing a scanned image I2. The scanning in step S210 is referred to as "scanning R2". The image data generated by the scanning R2 corresponds to second image data of the invention.

Figure 18:
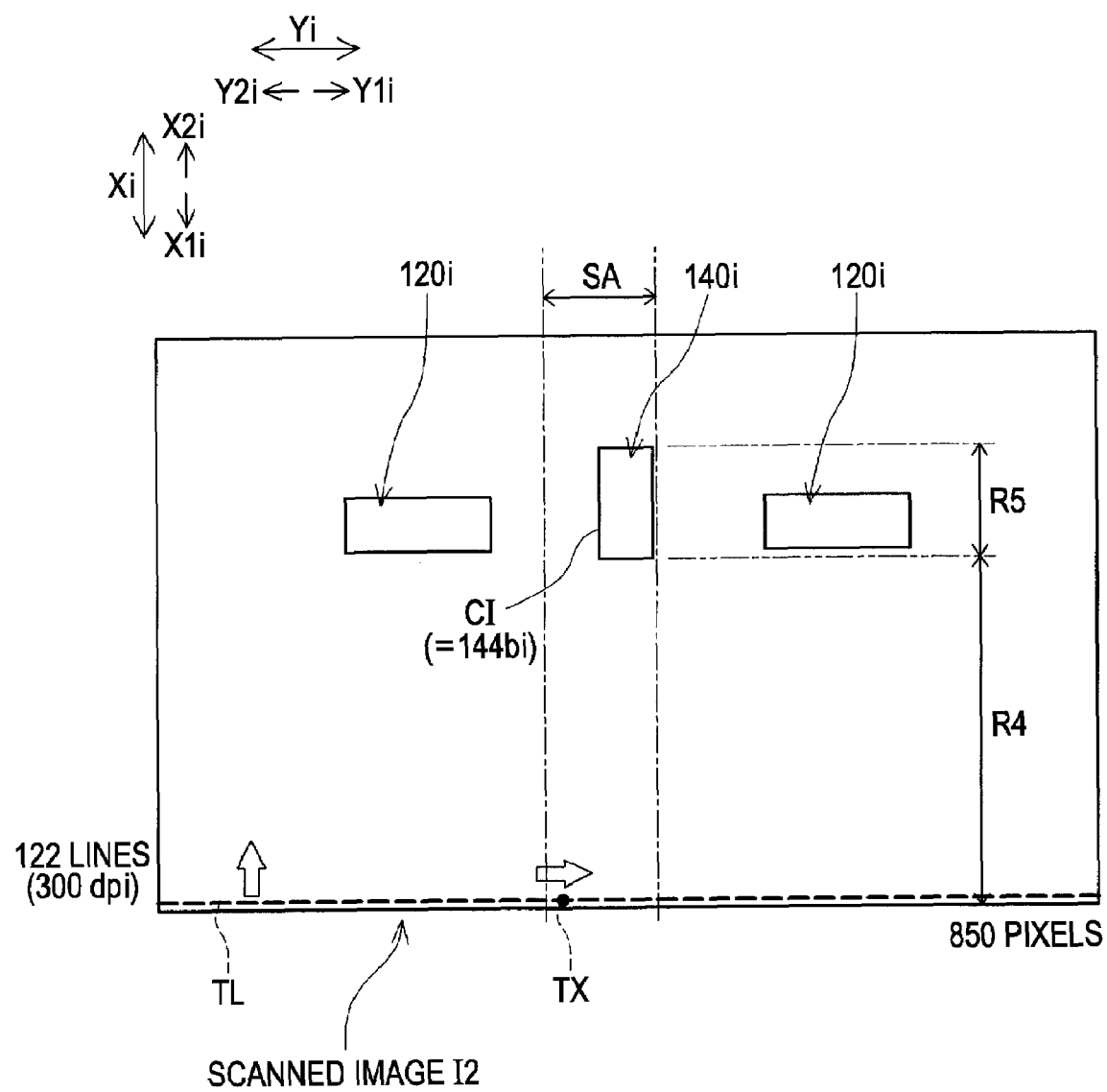
FIG. 18 is an explanatory diagram of an example of a scanned image generated by scanning.

FIG. 18 is an explanatory diagram of an example of the scanned image I2 generated by the scanning R2. As shown in FIG. 18, the scanned image I2 has a size of 850 pixels in the main scanning corresponding direction (the direction Yi) by 122 pixels in the subscanning corresponding direction (the direction Xi). In other words, the scanned image I2 is composed of 122 pixel lines as is the scanned image I1 (FIG. 14). The resolution of the scanned image I2 along the main scanning corresponding direction (the direction Yi) is 1,200 dpi, while the resolution of the scanned image I2 along the subscanning corresponding direction (the direction Xi) is 300 dpi, which is lower than the resolution (1,200 dpi) of the scanned image I1 along the subscanning corresponding direction. The resolution of the scanned image I2 along the subscanning corresponding direction (the direction Xi) is a resolution that is set in advance so that the scanned image I2 generated by the scanning of the base pattern with the resolution allows detection of at least the characteristic point CP. Specifically, the resolution is set within a range such that the distance between pixel lines adjacent to each other along the subscanning corresponding direction is shorter than the size of the characteristic image CI along the subscanning corresponding direction. The resolution of the scanned image I2 along the subscanning corresponding direction (the direction Xi) corresponds to a second subscanning resolution of the invention.

In step S220 (FIG. 7), the pattern searching section 270 of the control unit 230 (FIG. 3) searches the image data describing the scanned image I2 for the characteristic point CP. The method for searching for the characteristic point CP is the same as that of searching for the characteristic point CP in the base-pattern searching process in step S150 (FIG. 8). Specifically, the pixel-row selecting portion 272 selects pixel lines that constitute the scanned image I2 in sequence as the target line TL, and the characteristic-part searching portion 274 searches the search area (the initial search area SA or an unsearched area in the initial search area SA) on the target line TL for the characteristic point CP. The searching for the characteristic point CP is performed to specify the rough position of the base pattern. In the searching of the scanned image I2 for the characteristic point CP, the selection of a pixel line as the target line TL is executed in sequence from the outermost pixel line in the subscanning forward corresponding direction (the direction X1i), as shown in FIG. 18.

Since the scanned image I2 is an image generated by the scanning R2 using the general parameters, the scanned image I2 is not influenced by the position of the preliminary scanning PR in step S110. The general parameters are set so that the image data generated by the base pattern scanning using the general parameters allows detection of at least the characteristic point CP. Accordingly, if the scanned image I2 includes the base pattern image, the characteristic point CP will be detected from the target line TL in an area R5 of FIG. 18 irrespective of whether the preliminary scanning PR is executed under the white base plate 30. However, the characteristic point CP could be detected erroneously in an area R4 in FIG. 18 or in the scanned image I2 that includes no base pattern image because of the influence of dust or noise.

If the characteristic point CP is detected from the scanned image I2 (step S230: Yes), the control unit 230 (FIG. 3) moves the carriage 300 to the vicinity of the home position (step S250). The movement of the carriage 300 in step S250 is referred to as "movement E" (see FIG. 11). At the time in step S250, the image BLi of the base line BL of the base pattern has not been detected from the scanned image I2, while the characteristic point CP indicative of the rough position of the base pattern image has been detected. The control unit 230 calculates the amount of the movement E for moving the carriage 300 to the vicinity of the home position on the basis of the position of the characteristic point CP in the scanned image I2.

After the movement E (step S250 in FIG. 7), the process from step S110 to step S150 is executed again (see FIG. 11). At that time, the position of the carriage 300 at the start of the preliminary scanning PR (step S110) is in the vicinity of the home position. Therefore, the base pattern image is detected by the searching of the scanned image I1 for the base pattern image (step S150). Accordingly, in this case, the carriage 300 is moved to the home position (step S170) on the basis of the detected base pattern image, and the home-position searching process is completed.

When the characteristic point CP is detected from the scanned image I2, the control unit 230 moves the carriage 300 to the vicinity of the home position and executes the preliminary scanning PR again. This control unit 230 corresponds to a reprocessing instructing section or a first reprocessing instructing section of the invention.

In contrast, in step S230 (FIG. 7), if the characteristic point CP has not been detected from the scanned image I2 (step S230: No), then the control unit 230 (FIG. 3) moves the carriage 300 along the subscanning forward direction (the direction X1) by a predetermined distance (step S240), and executes the scanning R2 again (step S210). The movement of the carriage 300 in step S240 is referred to as "movement D" (see FIG. 12). The movement D is a process for providing the carriage 300 with a distance to reach a predetermined scanning speed in the second scanning R2 (step S210). Accordingly, in the scanning R2 after the movement D, no scanning is executed until the carriage 300 is moved by the distance corresponding to the movement D from the start of the movement, into a so-called idle running state.

As shown in FIG. 12, the control unit 230 (FIG. 3) repeats the scanning R2 and the movement D until the characteristic point CP is detected from the scanned image I2 (steps S210 to S240 in FIG. 7). When the characteristic point CP is detected from the scanned image I2, the control unit 230 returns to the process of step S110 after the movement E (step S250), as described above.

In the process of searching for the characteristic point CP in the scanned image I2 (step S220 in FIG. 7), the characteristic point CP could be detected erroneously from a portion other than the characteristic image CI on the scanned image I2 because of the influence of dust or noise. Also when the characteristic point CP is detected erroneously, the process from steps S110 to S150 is executed after the movement E (see FIG. 13), as in normal detection. Since this process is based on the position of the characteristic point CP erroneously detected, no base pattern image is detected from the scanned image I1 by the base-pattern searching process in step S150 (step S160 in FIG. 7: No). Since this is not the first detection failure (step S180: No), the carriage 300 is moved in the subscanning backward direction (the direction X2) by a predetermined distance (step S260), and the process from steps S200 to S220 is executed again. The movement of the carriage 300 in step S260 is hereinafter referred to as "movement F".

As shown in FIG. 13, the movement F is executed so that a position EP at which the characteristic point CP is misdetected is not scanned again in the following scanning R2 (step S210). Accordingly, the movement F moves the carriage 300 in the subscanning backward direction (the direction X2) with respect to the position EP at which the characteristic point CP is misdetected. The amount of the movement F is set in consideration of not generating nonscanning area between the scanning area by the following scanning R2 and the scanning area by the previous scanning R2.

As described above, the home-position searching process by the scanner 10 of the embodiment searches for the characteristic point CP across the search area which is part of the target line TL by the process of searching for the base pattern image from image data describing the scanned image I1 (step S150 in FIG. 7), and executes the setting of the pixel groups PG on the target line TL on which the characteristic point CP is detected and the determination of conditions for each pixel group PG. In other words, the setting of the pixel groups PG and the determination of conditions for each pixel group PG are not performed for a target line TL on which the characteristic point CP is not detected. Thus, the embodiment can reduce the time required to detect the base pattern image in the image data describing the scanned image I1.

The embodiment does not employ position search. Therefore, for the determination on conditions for each pixel group PG (step S380 in FIG. 8), only when the conditions are satisfied for all the seven pixel groups PG, it is determined that the base pattern image is detected, while if the conditions are not satisfied for one pixel group PG, it is determined that the detection of the base pattern image based on the set pixel group PG has failed irrespective of whether or not the determination on the other pixel groups PG has been executed. Accordingly, the embodiment can further reduce the time required to detect the base pattern image in the image data describing the scanned image I1.

In this embodiment, the pixel groups PG are set on the basis of the characteristic point CP (the adjusted characteristic point CPa) whose position is adjusted by the adjusting section 278 (FIG. 3). If the detection of the base pattern image based on the set pixel group PG has failed, the adjusted characteristic point CPa is reset with a changed adjusting value Va, and the setting of the pixel groups PG and the detection of the base pattern image are executed again. Thus, the embodiment can prevent omission of detection of the base pattern in the image data describing the scanned image I1.

In this embodiment, the pixel groups PG are set such that an interval corresponding to a predetermined number of pixels is provided between adjacent pixel groups PG (see FIG. 17). Thus, the embodiment can prevent omission of detection of the base pattern in the image data describing the scanned image I1.

In this embodiment, the scanning R2 for generating the scanned image I2 is performed using general parameters. The general parameters are set so that image data generated by base pattern scanning using the general parameters allows detection of at least the characteristic point CP. Therefore, when the scanned image I2 includes the base pattern image, the characteristic point CP is detected irrespective of whether or not the preliminary scanning PR is executed under the white base plate 30. When the characteristic point CP is detected, the rough position of the base pattern image is specified. Thus, the embodiment allows the base pattern image to be detected from the image data describing the scanned image I1 reliably and quickly.

In this embodiment, the searching for the characteristic point CP in the scanned image I2 is executed for part of the search area (the initial search area SA or an unsearched area in the initial search area SA). Thus, the embodiment can reduce the time required to search for the characteristic point CP in the scanned image I2.

In this embodiment, the scanned image I2 is generated as an image whose resolution along the subscanning corresponding direction is lower than that of the scanned image I1. Therefore, the scanning area by the scanning R2 for generating the scanned image I2 is wider than that by the scanning R1. Thus, the embodiment can reduce the time required to specify the rough position of the base pattern.

In this embodiment, when no base pattern image is detected from the scanned image I1 after the characteristic point CP is misdetected from the scanned image I2, the movement (the movement F) of the carriage 300 is executed so that the position at which the characteristic point CP is misdetected is not scanned again. Thus, the embodiment can reduce the occurrence of an endless process loop and specify the rough position of the base pattern reliably.

B. Modifications

It should be understood that the invention is not limited to the above embodiment and various modifications can be made without departing from the spirit and scope of the invention. For example, the following modifications may be made.

B1. First Modification

The structure of the scanner 10 of the embodiment is merely one example. Another structure may be employed for the scanner 10. For example, the scanner 10 may not be of the contact type but may be of a demagnification optical system using mirrors and lenses. The scanner 10 may have a DC motor in place of the stepping motor 226. The scanner 10 may be a multifunctional peripheral having a printer, for example. In such a case, for example, the control unit 230 and the power unit 250 shown in FIG. 2 may be shared by the scanner 10 and the printer.

In the embodiment, the mechanism for moving the carriage 300 of the scanner 10 along the subscanning direction (the guide rail 210, the timing belt 222, the pulleys 224, the stepping motor 226, and the gear 228) is merely one example. The movement of the carriage 300 along the subscanning direction may be achieved by using another mechanism.

B2. Second Modification

The structure of the base pattern of the embodiment is merely one example. Another pattern may be employed as the base pattern provided that the base pattern is configured by a plurality of areas arranged along the main scanning direction. Although the embodiment uses the second edge 144b of the second base mark hole 140 close to the main scanning backward direction as the characteristic part of the base pattern, another part of the base pattern may be used.

B3. Third Modification

Although the embodiment performs the detection of the characteristic point CP and the determination of conditions for each pixel group PG using the luminance of each pixel, the detection and determination may be executed using another value about the pixels. For example, when the scanned images I1 and I2 are generated as RGB image data, the detection and determination may be executed using G values.

Although the embodiment sets the resolution in the subscanning direction for the scanning R2 for generating the scanned image I2 low, this is not absolutely necessary. Also for the scanning R2, the same resolution as that in the scanning R1 for generating the scanned image I1 may be set. Although the scanning R2 is executed using general parameters, this is also not absolutely necessary. Also for the scanning R2, the scanning parameters set on the basis of the result of the preliminary scanning PR may be used.

Although the embodiment adjusts the position of the detected characteristic point CP and sets the pixel groups PG on the basis of the adjusted characteristic point CPa in the base-pattern-image searching process (FIG. 8), the adjustment of the position of the characteristic point CP may not be executed.

B4. Fourth Modification

The sizes (the number of the pixels along the main scanning corresponding direction and the subscanning corresponding direction) and the resolutions of the scanned images I1 and I2 of the embodiment are merely one example. The sizes and resolutions may be set at other values. The first threshold value T1 and the second threshold value T2 may also be set to any values. The adjusting value Va may also be set to any value.

B5. Fifth Modification

Part of the configuration achieved by hardware in the embodiment may be replaced with software. Conversely, part of the configuration achieved by software may be replaced with hardware.

What is claimed is:

1. An image scanning apparatus comprising:
    a scanning section which scans an object opposite to a linear scanning area along a main scanning direction while moving the scanning area along a subscanning direction intersecting the main scanning direction and which generates image data on the basis of the result of the scanning;
    a control unit that controls the scanning section; and
    a pattern area including a predetermined pattern that defines a base position for specifying a position to be scanned by the scanning section, the predetermined pattern having a characteristic part that specifies a rough position of the predetermined pattern along the subscanning direction, wherein the control unit includes:
- a first image acquiring section that acquires first image data by making the scanning section execute scanning at a first subscanning resolution;
- a pattern searching section that searches the first image data for the image of the predetermined pattern;
- a second image acquiring section that acquires second image data in such a manner that when the image of the predetermined pattern is not detected by the pattern searching section, the second image acquiring section makes the scanning section execute scanning at a preset second subscanning resolution lower than the first subscanning resolution so that image data generated by the scanning of the pattern area at the second subscanning resolution allows the image of the characteristic part to be detected therefrom;
- a characteristic-part searching section that searches the second image data for the image of the characteristic part; and
- a reprocessing instructing section which specifies the rough position of the pattern area along the subscanning direction on the basis of the position of the image of the characteristic part detected by the characteristic-part searching section and which makes the first image acquiring section execute scanning again at the rough position of the pattern area.

2. The image scanning apparatus according to claim 1, wherein
the second image acquiring section acquires the second image data repeatedly by making the scanning section execute scanning repeatedly while changing the scanning position until the image of the characteristic part is detected by the characteristic-part searching section.

3. The image scanning apparatus according to claim 1, wherein:
the predetermined pattern includes a plurality of areas arranged along the main scanning direction; and
the characteristic part is the boundary of two adjacent areas of the areas that constitute the predetermined pattern.

4. The image scanning apparatus according to claim 3, wherein
the second subscanning resolution is such that the distance between adjacent pixel rows along the subscanning direction of the image data is shorter than the distance corresponding to the length of the characteristic part along the subscanning direction.

5. The image scanning apparatus according to claim 1, wherein
the characteristic-part searching section searches for the image of the characteristic part across partial data corresponding to the position of the characteristic part in the second image data.

* * * * *